US010845288B2

(12) United States Patent
Chen et al.

(10) Patent No.: US 10,845,288 B2
(45) Date of Patent: Nov. 24, 2020

(54) CURVED CLASSIFIERS AND CLASSIFICATION METHODS

(71) Applicant: VIRGINIA COMMONWEALTH UNIVERSITY, Richmond, VA (US)

(72) Inventors: Daren Chen, Glen Allen, VA (US); Qiaoling Liu, Richmond, VA (US)

(73) Assignee: VIRGINIA COMMONWEALTH UNIVERSITY, Richmond, VA (US)

(*) Notice: Subject to any disclaimer, the term of this patent is extended or adjusted under 35 U.S.C. 154(b) by 66 days.

(21) Appl. No.: 15/768,574

(22) PCT Filed: Nov. 11, 2016

(86) PCT No.: PCT/US2016/061494
§ 371 (c)(1),
(2) Date: Apr. 16, 2018

(87) PCT Pub. No.: WO2017/083621
PCT Pub. Date: May 18, 2017

(65) Prior Publication Data
US 2019/0056300 A1  Feb. 21, 2019

Related U.S. Application Data

(60) Provisional application No. 62/254,741, filed on Nov. 13, 2015.

(51) Int. Cl.
*G01N 15/02* (2006.01)
*B03C 3/15* (2006.01)
(Continued)

(52) U.S. Cl.
CPC ........... *G01N 15/0266* (2013.01); *B03C 3/15* (2013.01); *B03C 3/36* (2013.01); *G01N 2015/0038* (2013.01); *G01N 2015/0046* (2013.01)

(58) Field of Classification Search
CPC .... B03C 7/00; B03C 7/02; B03C 7/12; B03C 3/017; B03C 3/0175; B03C 3/15;
(Continued)

(56) References Cited

U.S. PATENT DOCUMENTS 1,381,719 A * 6/1921 McGee ............... B03C 3/15
                                                      95/69
2,924,294 A * 2/1960 Johnstone .......... B03C 3/15
                                                      96/17
(Continued)

FOREIGN PATENT DOCUMENTS

GB        2 416 913 A      2/2006

*Primary Examiner* — Joseph C Rodriguez
(74) *Attorney, Agent, or Firm* — W&C IP

(57) ABSTRACT

A particle electrical mobility classifier is provided for the classification of particles (e.g., particles less than 1 μm in size) based on their electrical mobility. The particle classification zone is curved. In an exemplary embodiment, two metal concentric cylinders, separated by an annular insulation spacer, establish a particle classification zone. A DC electrical field is supplied by the cylinders in the circular classification zone. An example classifier can be operated in different modes such as: (1) as a particle precipitator; (2) as a particle electrical mobility separator, and (3) as a differential mobility classifier. The curved classification zone results in a particle classifier having an extended particle sizing range as compared to their counterparts in classical configurations. The curve of the classification channel (in the flow direction) may be in any of several configurations (e.g., circular, wavy, spiral, or helical).

12 Claims, 23 Drawing Sheets

(51) Int. Cl.
*G01N 15/00* (2006.01)
*B03C 3/36* (2006.01)

(58) Field of Classification Search
CPC .............. B03C 3/36; G01N 15/0266; G01N 2015/0038; G01N 2015/0046
See application file for complete search history.

(56) References Cited

U.S. PATENT DOCUMENTS

| | | | | |
|---|---|---|---|---|
| 4,352,681 A * | 10/1982 | Dietz | ............... | B01D 45/12 96/61 |
| 4,398,928 A * | 8/1983 | Kunsagi | ............... | B04C 9/00 239/504 |
| 4,977,785 A * | 12/1990 | Willoughby | ........ | H01J 49/0445 239/86 |
| 5,117,190 A * | 5/1992 | Pourprix | ............ | G01N 15/0266 324/452 |
| 5,428,220 A * | 6/1995 | Ehara | .................. | B04B 5/08 250/281 |
| 5,606,112 A * | 2/1997 | Flagan | ............... | G01N 15/0266 73/28.04 |
| 6,230,572 B1 * | 5/2001 | Pui | .................. | B82Y 15/00 73/863.21 |
| 6,259,101 B1 * | 7/2001 | Wexler | ................ | G01N 21/718 250/287 |
| 6,905,029 B2 * | 6/2005 | Flagan | ............... | B01D 21/0009 209/142 |
| 7,213,476 B2 * | 5/2007 | Cheng | ................ | G01N 15/0266 73/865.5 |
| 7,437,908 B2 * | 10/2008 | Bae | .................... | G01N 15/0656 324/71.4 |
| 7,683,315 B2 * | 3/2010 | Belford | ................... | H01J 49/42 250/281 |
| 7,732,725 B2 | 6/2010 | Takagi et al. | | |
| 7,880,109 B2 * | 2/2011 | Okuda | ............... | G01N 15/0266 209/129 |
| 8,919,183 B1 * | 12/2014 | Dhaniyala | .......... | G01N 15/0266 73/28.02 |
| 8,966,958 B2 * | 3/2015 | Olfert | ................ | G01N 15/0255 73/28.01 |
| 9,239,279 B1 * | 1/2016 | Koizumi | ................ | H01J 49/025 |
| 9,677,984 B2 * | 6/2017 | Zachariah | .......... | G01N 15/0266 |
| 2006/0266132 A1 | 11/2006 | Cheng et al. | | |
| 2009/0173670 A1 * | 7/2009 | Okuda | ............... | G01N 15/0266 209/127.1 |
| 2010/0213366 A1 | 8/2010 | Fernandez De La Mora et al. | | |
| 2012/0096924 A1 | 4/2012 | Olfert | | |
| 2019/0120743 A1 * | 4/2019 | Flagan | ............... | G01N 15/0266 |

\* cited by examiner

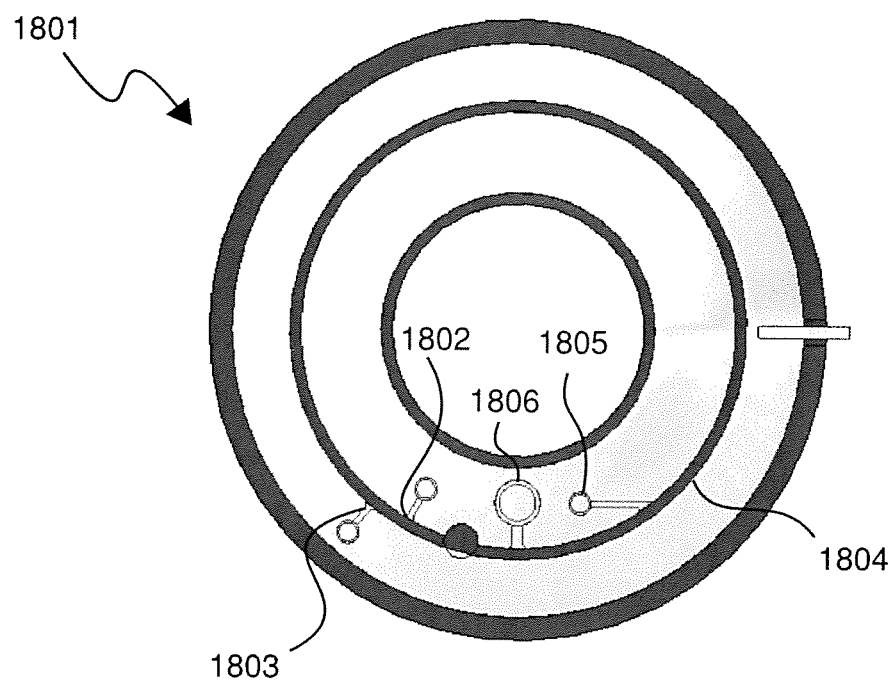
*Figure 18A*
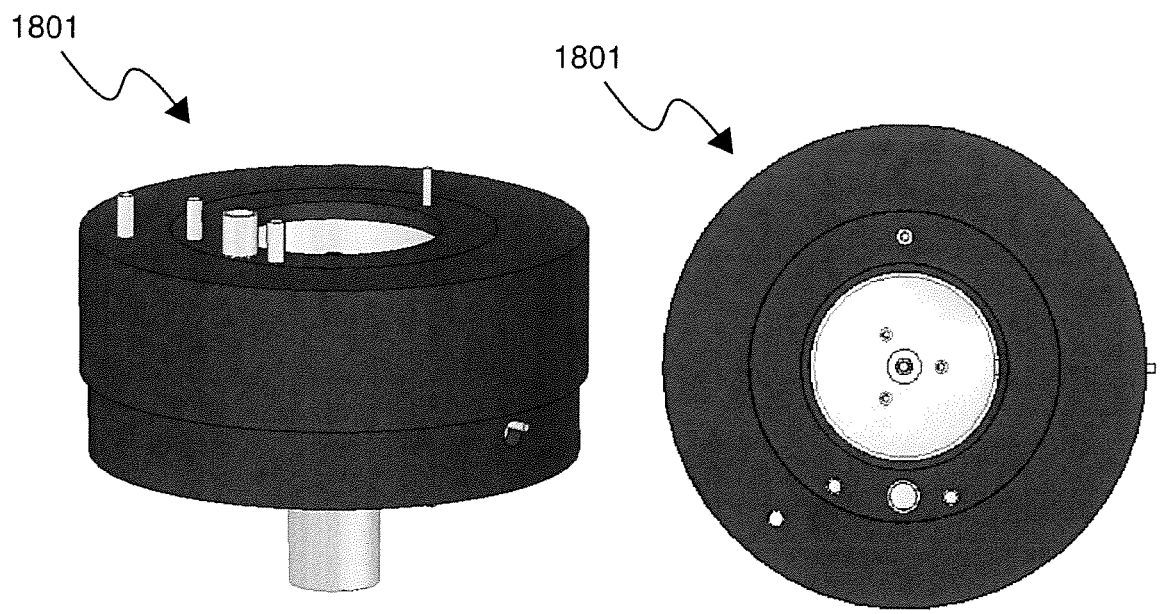
*Figure 18B*  *Figure 18C*

CURVED CLASSIFIERS AND CLASSIFICATION METHODS

STATEMENT REGARDING FEDERALLY SPONSORED RESEARCH OR DEVELOPMENT

This invention was made with government support under B83513201 awarded by the US Environmental Protection Agency (EPA). The government has certain rights in the invention.

FIELD OF THE INVENTION

The invention generally relates to particle classifiers, analyzers, sizers, and counters. More specifically, the invention relates to compact or miniaturized classifiers and related apparatuses and methods.

BACKGROUND

Sensors/monitors for measuring size distribution and/or mass concentration of airborne particulate matter (PM), especially in sizes less than 1.0 µm, are required for various applications involving particles. Miniaturized particle sizers/monitors are in high demand for distributed and personal-level fine particle monitoring, in applications related to outdoor as well as indoor air quality.

Classification of particles based on their electrical mobility is a powerful technique for sizing/classifying particles less than 1 µm in size. Particle electrical mobility classifiers (or analyzers) are the instruments realizing this technique. Electrical mobility classifiers/analyzers have been popularly applied in studies and applications related to particles with sizes less than 1 µm.

In general, electrical mobility classifiers/analyzers are shaped in cylindrical, planar, or radial configurations. In all three shape variants, a particle's path or direction of movement in the classification zone is substantially linear. The path or direction of movement is controlled by the sheath flow and the applied electric field. In classical configurations, regardless of the shape of the overall device or its classification channel, sheath flow is substantially linear.

In a cylindrical classifier, sheath flow is substantially parallel to a primary longitudinal/center axis of a cylindrical body which provides the classification channel. That is to say, the linear sheath flow travels parallel with the longitudinal axis of the cylindrical body. Similarly, particles move through the classification channel in a substantially linear path that is parallel with the cylinder's center axis. The only non-linear component to particle path is particle drift caused by the electrical field. By way of example, U.S. Pat. No. 8,919,183 B1 discloses a differential mobility analyzer with a cylindrical configuration. FIG. 2 illustrates how sheath flow is linear and longitudinally directed (top to bottom in the figure) and the electrical field is applied radially across the channel (right to left in the figure). The figure is illustrative of the fact that particles do not change angular position (e.g., within a cylindrical coordinate system).

In a planar classifier, linear sheath flow drives particle flow across a plane in substantially a straight path. The only deviation from a straight particle path is the drift induced by the electrical field. By way of example, European Patent No. 1923699 A1 discloses a differential mobility analyzer with a planar configuration.

A radial classifier appears somewhat cylindrical, but differs from cylindrical classifiers in that sheath flow moves along a radial direction instead of a longitudinal direction. By way of example, U.S. Pat. No. 5,117,190 A shows a radially configured analyzer. U.S. Pat. No. 5,606,112 shows another radially configured analyzer. Sheath flow in radial classifiers is linear, as evidence by the fact that net movement of gas particles which make up the sheath flow travel linearly along radial axes.

To classify particles, especially particles of relatively large sizes, classifiers often require long classification channels in which particles can travel, which results in large classifier dimensions. Classical classifier designs are not suitable for miniature particle mobility sizers, especially those which are intended to cover a large particle size range, a desired feature for classifiers. Future sensor network for temporospatial measurements of particles such as air quality monitoring in smart cities requires cost-effective, miniature, and light-weighted PM sensors.

U.S. Pat. No. 8,919,183 to Dhaniyala et al. relates to a differential mobility analyzer (DMA) for electrical mobility based size segregation of particles over a range of submicron sized particles. The DMA contains a cylindrical annular classification region. The classification region has large dimensions in order to enable a high flowrate and a cylindrical shape with straight channels.

U.S. Pat. No. 9,095,793 to Flagan et al. describes a radial opposed migration aerosol classifier (ROMAC) for separating particles by size. Flagan's solution to long column DMAs is to provide a ROMAC with a classification channel having an upper and lower circular wall that are permeable to a flow of fluid. As shown in FIG. 2, the particles are subject to a cross-flow that imparts a drag force on the particles as they traverse the classification region. In the classification region the particles flow in a linear direction towards the central outflow port.

U.S. Pat. No. 5,606,112 to Flagan et al. discloses a radial differential mobility analyzer with a similar design as Flagan '793 which uses differential displacement of particles in an electrical field to classify the particles.

SUMMARY

Embodiments of the invention are directed to new apparatuses and methods for classifiers and particle classification in compact packages.

In general, an electrical mobility classifier (or simply "classifier" in this disclosure) takes a polydisperse aerosol input, separates aerosol particles based on their different electrical mobilities, and gives a classified aerosol as output. Particle size correlates with electrical mobility, therefore separating (charged) particles by electrical mobility has the effect of separating particles by size. Commercial products which separate particles by their electrical mobility assume various names. The nouns that are most common are "classifier" and "analyzer", although other names may also exist, such as "separator". These nouns are frequently preceded by a string of adjectives such as "mobility", "differential mobility", "electrical mobility", "differential electrical mobility", and others. Sometimes the naming system is based on the number of outlets, e.g., whether there is one aerosol outlet or two aerosol outlets. For ease and clarity of discussion in this disclosure, the noun "classifier" will be used for any device that is configured to separate aerosol particles based on electrical mobility. In practice, other short and long form names such as those discussed in this paragraph may be interchanged for the name "classifier" in various embodiments.

According to an exemplary aspect of embodiments of the invention, a classifier is provided in which the particle classification zone (of the classification channel) is curved. This contrasts with conventional classifiers that have linear classification zones. A curved classification zone or channel maximizes particle traveling distance but minimizes the overall size of the classifier as compared to classical linear classification configurations. For instance, an exemplary classifier of the present invention can have a classification zone that is the same size as a linear classification zone but with a small overall footprint.

In some exemplary embodiments, the curved classification channel is configured to conduct flow in an angular direction by which aerosol particles rotate about a longitudinal axis of the device while in a classification zone. Angular direction refers to the phi ($\varphi$) component of a particle's position (according to cylindrical coordination system, for example). The particles positional component $\varphi$ changes with respect to time while in the classification zone.

In some embodiments, the classification channel is curved but the channel width and height are constant. Particle classifiers with a curved particle classification channel have an extended particle size sizing range as compared to their counterparts in classical configurations of the same or larger footprints. The curve of the classification channel is with respect to the flow direction. The curved channel may be configured in any of several forms, such as circular, wavy, spiral or helical. Classical classification channels, although frequently cylindrical in cross section, are always straight in the flow direction. In other words, aerosol particles travel in an axial direction of the cylindrical channel. In contract, embodiments of the present invention are configured to move or urge aerosol particles in an angular or circumferential direction of the curved channel. Such novel configurations maximize space utilization of the overall classifier or analyzer. A curved channel feature is particularly useful for miniaturization of mobility classifiers. It is roughly estimated that a mobility classifier using configurations disclosed herein can extend the length of classification channel by at least a factor of three or more, compared with that of mobility classifiers in classical configurations (i.e., cylindrical, radial and parallel-plate) under the same package.

According to another exemplary aspect of embodiments of the invention, sheath flow that is provided inside a classification channel is provided such that the direction or vector of the sheath flow is angular, or curved. In a cylindrical coordinate system, the directional vector of sheath flow has a non-zero angular component. In simpler more intuitive language, the sheath flow travels along a curved path, as opposed to a straight or linear path. The structural aspects of embodiments which provide non-linear sheath flow include the configuration of the classification channel, in particular the classification zone, as well as the configuration of the inlets and outlets, especially the inlet ports. For instance, a total flow may be directed by wall parts which are curved, the total flow following a curvature of the wall parts.

As used herein, "classification channel" refers to a channel at least part or portion of which is used for classification of particles by electrical mobility. By comparison, "classification zone" is used to describe the part(s) or portion(s) of the channels in which classification actually occurs. Because classification is achieved using an electrical field, it is generally accurate that 100% of the classification zone contains an electric field. In some embodiments, the boundaries of an electric field can be used to define some of the boundaries of a classification zone. Boundaries of electric fields, in turn, may be defined according to where electric field potential exists that is strong enough to significantly influence aerosol particle position. Boundaries of electric fields may also be defined according to the edges or boundaries of structures which provide the electric field. For instance, if two opposing surfaces, walls, or plates generate an electric field therebetween, a line or plane drawn between the opposed corresponding edges of such surfaces, walls, or plates shows the boundary/edge of the electric field therebetween.

For some exemplary embodiments, the classifier has a circular/annular particle classification channel. In some exemplary embodiments, the channel is provided by inner and out walls parts which may be, for example, two metal concentric cylinders or rings separated by an annular insulation spacer to establish a particle classification zone. The sectional view of the classification channel may be rectangular. One of the wall parts (either inner or outer) is connected to a high DC voltage while the other is connected to electrical ground, creating stable DC electrical field in the circular classification channel. Two inlets (one for sheath flow and another for polydisperse aerosol particles) and one or two outlets (other for classified aerosol particles and sometimes another for excess flow) are included in some prototype embodiments. A prototype and its performance data is described for operation in different modes: (1) as particle precipitator, and (2) as particle electrical mobility separator/differential mobility classifier. All the particles are assumed to be electrically charged prior to entering the prototype the classification zone.

According to an example precipitator mode, charged aerosol particles are introduced from an aerosol inlet, while any other inlet, if present in a given embodiment, is blocked. Particles passing through the channel exit the classification channel from one preselected outlet, all other outlets, if present, being closed.

According to an example separator mode, aerosol particles are introduced to the classification channel by a polydisperse aerosol inlet, and particle-free flow is introduced by a sheath flow inlet. The total flow (i.e., aerosol flow and sheath flow combined) is exited from one of the outlets (with the other, if present, is blocked).

According to an example differential mode, aerosol flow enters the classification channel by a polydisperse aerosol inlet, and clean flow (e.g., particle free flow) enters by a sheath flow inlet. Classified particles will exit the prototype from an aerosol outlet, and a remainder of the flow exits from another outlet (e.g., an excess flow outlet). In some exemplary embodiments, the aerosol flow inlet port is angled with respect to the classification channel such that the polydisperse aerosol flow is angularly admitted (e.g., injected) into the classification channel.

Experimental data is presented which analyzes the performance of a prototype using the standard Tandem differential mobility analyzer (TDMA) technique. This technique involved the prototype operating in a differential mode at two flow rate ratios (i.e., aerosol-to-sheath flowrate ratio). Experimental data of TDMA curves is provided for 80 nm particles. The TDMA result shows the working feasibility of the prototype embodiment.

Some exemplary embodiments provide a miniature electrical ultrafine particle sizer (e.g., "mini-eUPS"). To greatly reduce the package (e.g., footprint, total device volume, total device mass, total device weight, etc.) of mini-eUPSs while extending its sizing range, the device is configured as a curved particle electrical mobility classifier. Prototype eUPSs and personal eUPSs with curved classifiers shall be easy to move (by a person) from one location to another, easy to be installed in various sites, easy for the maintenance and low cost of ownership. Moreover, by integrating with a wireless module, mini-eUPSs based on curved size-classifiers and the sensor network using mini-eUPS as the nodes will be a very powerful tool for monitoring outdoor/indoor air quality, personal exposure and particle emission and many more applications.

Classifiers, analyzers, and similar devices according to the invention are employable for a wide variety of uses. With the increasing concern of health and environmental impact resulted from fine and ultrafine particles, miniaturized particle analyzers with a wide detection size range are in high demand. Many different areas require measuring (or monitoring) and characterizing size distribution of particles with sizes less than 1.0 um, a task for which embodiments of the invention are especially well suited. For example, embodiments of the invention may be configured for applications such as:

(1) Fundamental study of aerosol particles; used for monodisperse aerosol generation and particle sizing;
(2) Air pollution study indoor/outdoor; air quality measurement/monitoring, for example, indoor/outdoor PM2.5 monitoring and emission inspection;
(3) Industrial hygiene and personal exposure monitoring;
(4) Particle and air pollution control; and
(5) Quality control of fine powder material production.

Embodiments of the invention are suited for virtually any type of aerosol. The aerosol particles may be solid particulates, liquid particulates (droplets), or some combination of solids, liquids, or some combination of phases. An aerosol may consist of or comprise organic molecules, inorganic molecules, dust, industrial emissions, bacteria, and/or viruses.

Also, with consideration of easy maintenance, the new curved particle separator was designed to be easily opened and easily clean.

BRIEF DESCRIPTION OF THE DRAWINGS

FIGS. 18A to 18D show various views of an alternative embodiment;

DETAILED DESCRIPTION

Figure 1A:
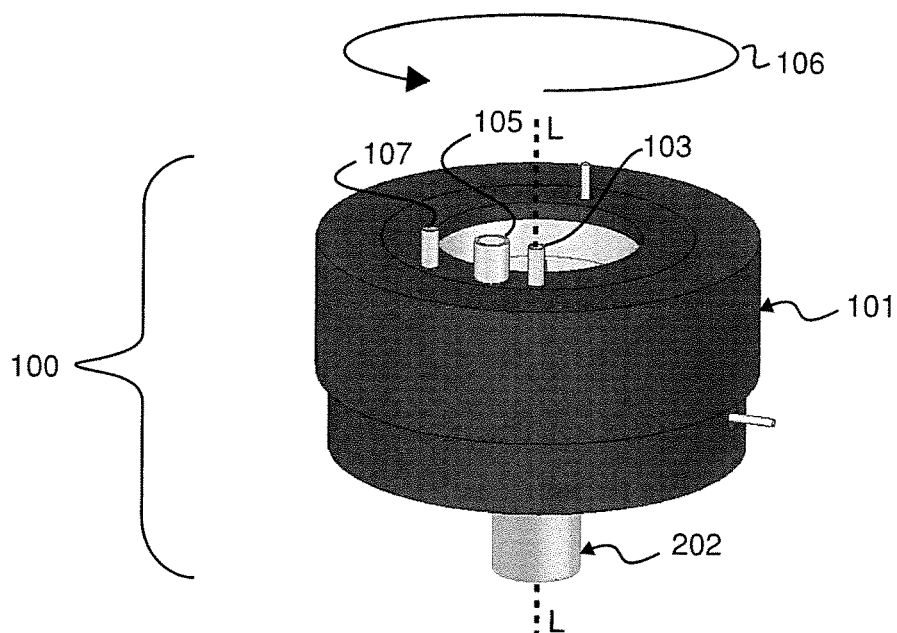
FIGS. 1A to 1C show an assembled classifier system, including an integrated counter/collector.

FIGS. 1A to 5 and their accompanying descriptions introduce an exemplary classifier as a series of assembly views, starting with an exemplary complete assembly in FIG. 1A. Each successive figure is a partial exploded view of the former figure, resulting in a dissection of the classifier part-by-part until there are no further parts to separate.

Figure 1B:
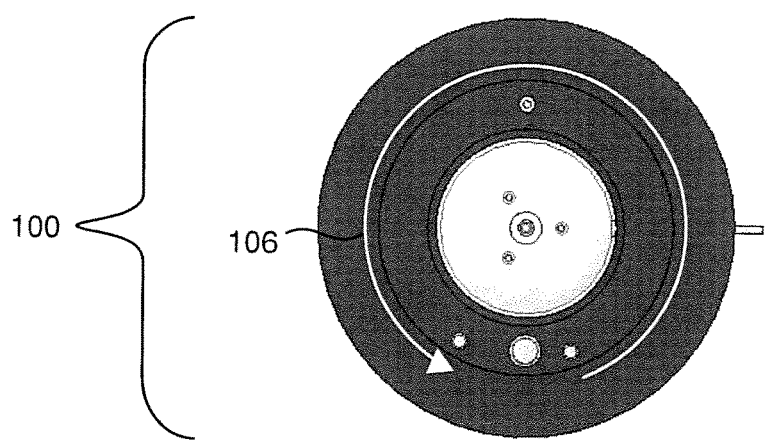
Figure 1C:
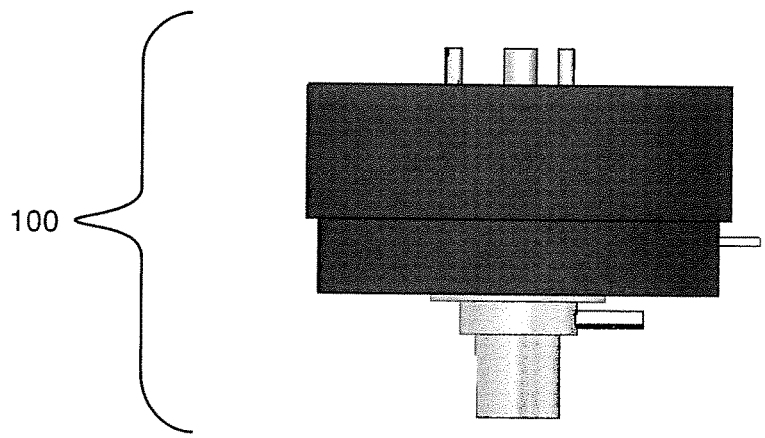
Figure 2:
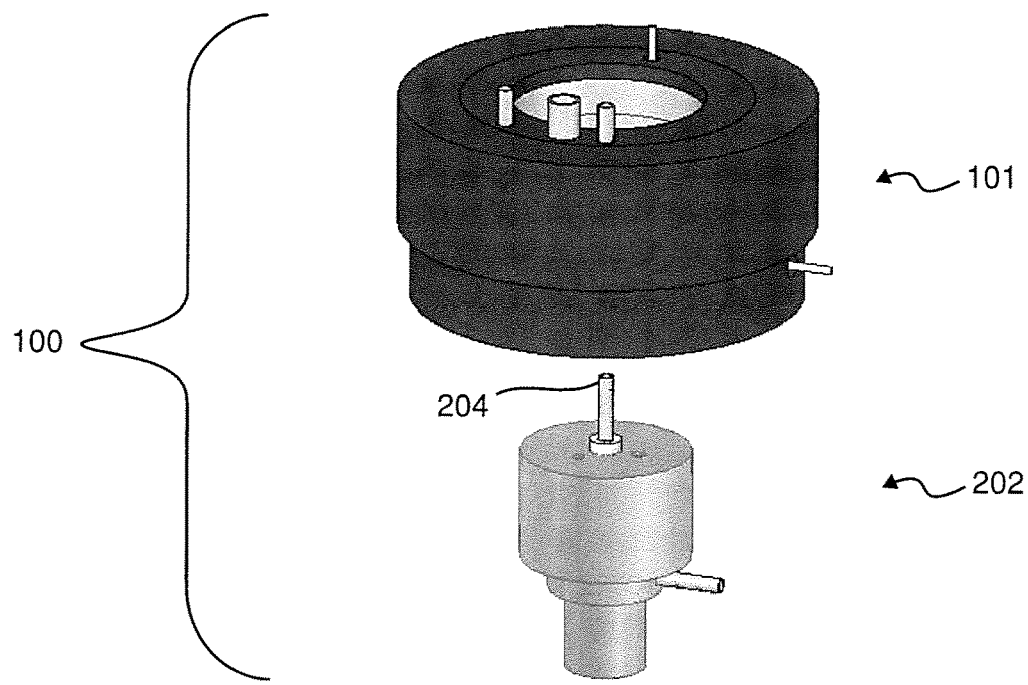
FIG. 2 shows an exploded view of the FIG. 1 classifier system in which the integrated counter is displaced with respect to the main classifier assembly.
Figure 3:
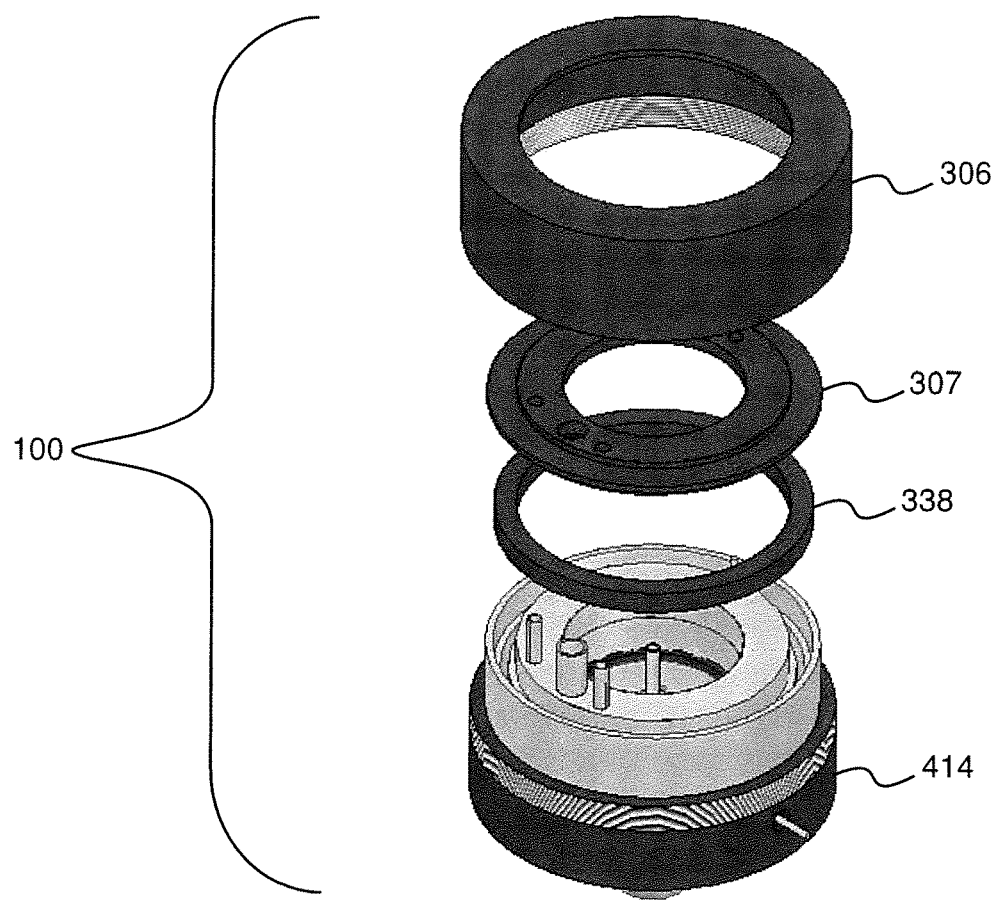
FIG. 3 shows an exploded view of the FIG. 1 classifier in which electrically insulative housing elements are displaced from the classification channel assembly.
Figure 4:
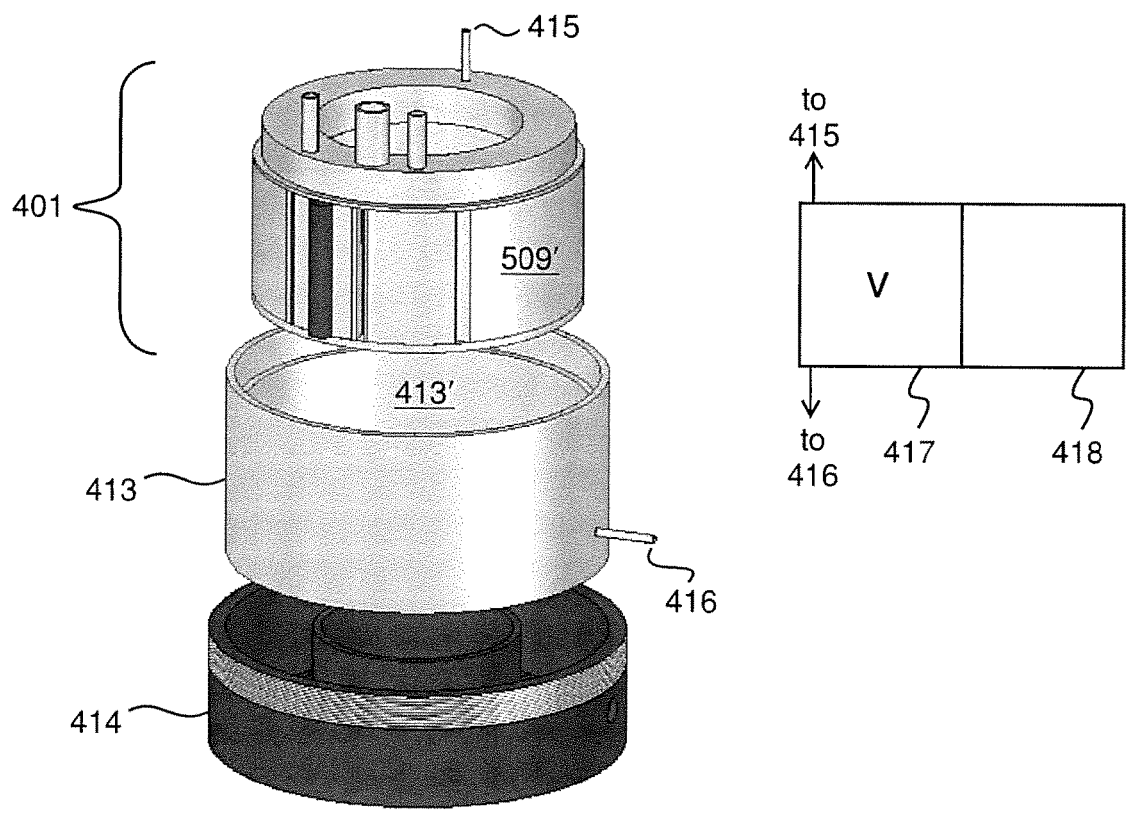
FIG. 4 shows an exploded view of the FIG. 1 classifier in which the outer wall part of the classifier channel is displaced from the inner assembly.

FIGS. 1A to 1C show a classification system 100 in a fully assembled state. The system 100 includes a classifier 101 and a particle counter (or collector) 202. Element 202 may also be referred to as a concentration detector. The classifier 101 has at least two inlets and one outlet, although variations may include additional inlets and/or outlets. Aerosol inlet 103 is configured for admitting (i.e., receiving) an aerosol flow that contains particles to be classified. The admitted aerosol flow is typically a polydisperse aerosol flow, although monodisperse aerosol flows can also be admitted such as for purposes of calibration or quality testing.

In an operational state, aerosol flow inlet 103 is connected downstream of a particle charger (not shown) that gives each aerosol particle a non-neutral charge (e.g., a positive charge or negative charge) prior to admittance to the classification channel of the classifier 101. A particle charger may be a standalone element or, alternatively, it may be incorporated into the system 100. Generally, a particle charger give all the particles in the polydisperse sizes a known and stable charge level.

Sheath flow inlet 105 is adjacent to the aerosol flow inlet 103 and is configured for admitting or receiving a particle-free flow to the classification channel of the classifier 101. The sheath flow drives/urges aerosol particles through the classification channel, in particular counterclockwise from the start of a classification zone as indicated by arrow 106 in FIGS. 1A and 1B. The outlet 107 is arranged at or near an end of the classification channel. In an operational state, only particles of preselected size or size range exit the outlet 107 of the classification channel. The aerosol leaving the outlet is characterizable as an aerosol having electrical mobility less than a certain value. Alternative embodiments may have one or more additional outlets used for excess flow and/or for other aerosol streams containing particles of larger or smaller sizes as compared to those in the flow exiting outlet 107.

The sheath flow inlet 105 is arranged upstream of the aerosol inlet 103 and is separated from the outlet 107 by a cylindrical rubber blockage. It is generally desirable to group all three ports as close together as reasonably possible in order to maximize the size of the largest circumferential/arc path between the aerosol inlet 103 and outlet 107. In some embodiments, the circumferential distance between the inlet 103 and outlet 107 is approximately equal to the length of the classification channel. For classifier 101, the outlet 107 is configured to permit the total flow (the aerosol flow and the sheath flow together) to exit the classification channel. While the total flow in terms of gas volume exits the classification channel at outlet 107, only a fraction of the aerosol particles admitted to the classification channel exit the classification channel. Namely, only aerosol particles of a preselected size or preselected size range exit the classification channel. The remainder of the aerosol particles which are not of the preselected size or size range deposit on one or more walls of the classification channel, where they generally remain until the channel is cleaned. For embodiments with multiple outlets, total flow may be divided among open outlets.

FIG. 2 shows the classifier 100 in a partial exploded view which shows the quantifier 202 displaced with respect to the classifier 101 along a shared center axis L. The quantifier 202 is a downstream component to the classifier 101. The outlet 107 of the classifier is connected (e.g., in fluid communication with) the inlet 204 of the quantifier 202. The quantifier 202 is nested or nestable at a center location of the classifier 101, making the system 100 highly compact. A classifier 101 may have any variety of shapes which allow for the quantifier 202 to nest inside of it, including, for example, donut-shaped, ring-shaped, helical-shaped, and spiral-shaped.

The quantifier 202 is configured to determine particle concentration for an aerosol flow admitted through inlet 204. Based on the flow volume and the predetermined particle charge level, the system 100 is able to determine a number of particles present of a preselected size or size range.

In some exemplary embodiments, the quantifier 202 is a miniature Faraday cage. In alternative embodiments, other types of quantifiers are included. In other alternative embodiments, no quantifier is used. A significant advantage of the quantifier 202 illustrated in the figures, however, is that the option exists to include the quantifier 202 without significantly increasing (e.g., without increasing at all) the overall size (e.g., outer dimensions) of the system 100. When the quantifier 202 is nested inside the outer boundaries of the classifier 101, the dimensions of the system 100 may be identical to the dimensions of the classifier 101.

FIG. 3 shows a partial exploded view of the system 100 in which electrically insulating elements have been displaced axially from a remainder of the classifier 101. The outermost housing component for the top half of the classifier 101 is a top case part 306, which together with a bottom case part 414 encases the entire assembly of the classifier 101. The case parts 306 and 414 are configured (e.g., in material, thickness, surface area) to permit contact by users without risk of electrical shock. In other words, the case parts render the device safe to touch by humans. Directly beneath the top case part 306 is a top cover part 307. The top cover part 307 serves to insulate top surfaces of the classifier 101, in contract to the top case part 306 which insulates both a top surface as well as side surfaces of the classifier 101. Directly beneath the top cover part 307 is spacer 338 which here is an insulative O-ring. The spacer 338 is a consequential spacing element which may affect the size of the classification channel. The O-ring may have a square cross-sectional profile, for example. The classification channel size and the physical components which determine classification channel dimensions will be discussed below.

FIG. 4 is another partial exploded view of the system 100. For clarity of illustration, the quantifier 202 as well as elements 306, 307, and 338 from FIG. 3 have been omitted. The bottommost element shown in FIG. 4 is the bottom case part 414 which was introduced in the paragraph above. At the top of FIG. 4 is an inner assembly 401, a combination of parts which will be explained below in connection with FIG. 5. Shown in the middle of the exploded view between the bottom case part 414 and the inner assembly 401 is an outer wall part 413. The innermost surface 413' of the outer wall part 413 functions as an outer wall of the classification channel in the fully assembled state of the classifier 101. In contrast, the outer surface 509' of the inner assembly 401 acts as an inner wall of the classification channel in the fully assembled state. From FIG. 4 it can be appreciated that the inner assembly 401 nests inside the outer wall part 413. In the illustrated embodiment, both the outer wall part 413 and the inner assembly 401 are annular with constant inner and outer diameters. The outer diameter of the inner assembly 401 is smaller than the inner diameter of the outer wall part 413. Half of the difference in these two diameters defines a height of the classification channel. In an assembled state, the outer wall part 413 and the inner assembly 401 are coaxial and nested together. In an operational state, one of the inner assembly 401 (more specifically the inner wall part 509 thereof) and the outer wall part 413 is positively charged while the other is negatively charged or connected to ground. Alternatively, one is negatively charged while the other is positively charged or connected to ground. The potential difference, in particular between the outer surface 509' of the inner assembly 401 and the inner surface 413' of the outer wall part 413 generates an electric field in the classification zone of the classification channel. An electrical lead 415 is arranged for connecting the inner assembly 401 to a power source or ground, and an electrical lead 416 is arranged for connecting the outer wall part 413 to a power source or ground. A power source 417 (e.g., a voltage source) is illustrated schematically to the side of FIG. 4 and may be supplemental to or included with a system 100. One or more control circuits and/or computers (e.g., processors), generally represented schematically as block 418, may be included in the system 100 to control various settings of the system's components. For instance, control circuitry or computer(s) 418 may be used to set or adjust variables such as sheath flow rate, (polydisperse) aerosol flow rate, total flow rate, applied voltage, electric field strength, electric field direction/polarity, among other possible variables. The values to which such variables are set or adjusted depend on the selected particle size(s) or size range(s) for which classification is desired. Variables such as applied voltage can be varied over time. Such variables like applied voltage can be varied continuously or incrementally (e.g., in discrete steps). The circuits and/or computers 418 may include a wireless module for interconnecting multiple classifiers over a network.

Figure 5:
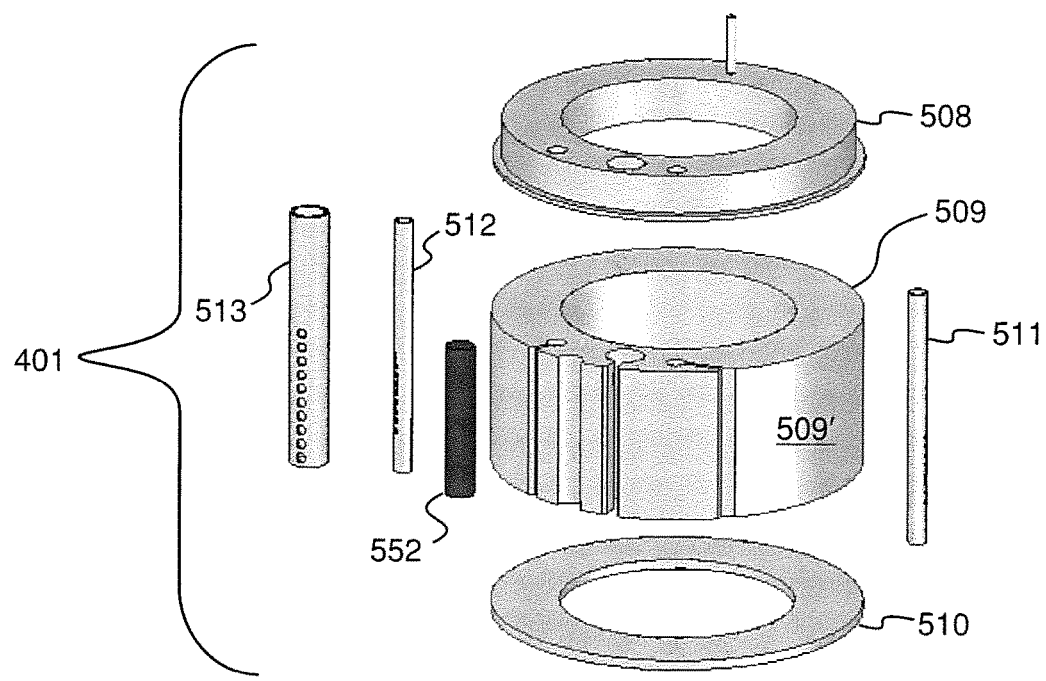
FIG. 5 shows an exploded view of the inner assembly for the FIG. 1 classifier.

FIG. 5 is an exploded view of the inner assembly 401. As compared to FIG. 4, the outer wall part 413 and the bottom case part 414 are both omitted from illustration in FIG. 5. The inner assembly 401 includes an inner assembly top cover 508, an inner wall part 509, and an inner assembly bottom cover 510. The outer surface 509' of the inner wall part 509 serves as the inner surface of the classification channel of the classifier when fully assembled. The inner wall part 509 includes a respective hole, bore, or groove for receiving each of elements 511, 512, 513, and 552. A polydisperse aerosol is transported into the classifier by a conduit 511. Sheath flow is transported into the classifier by a conduit 513. A classified aerosol is transported out of the classifier by a conduit 512. During one or more modes of operation, each of the conduits 511, 512, and 513 are in fluid communication with the classification channel. In some modes of operation one or more of the conduits may be disconnected from fluid communication with the classification channel. The connections between the conduits and the classification channel will be discussed in greater detail below, primarily in connection with FIGS. 9A-9C and FIG. 15. Element 552 is made of electrically insulated rubber, which is used to stop the flows moving to the outlet 512 without passing through a classification zone. Top cover 508 and bottom cover 510 serve a purpose of capping the end of flow channels embedded in the inner assembly in order to avoid flow leak.

FIGS. 6 to 14 and their accompanying descriptions revisit the individual components introduced in the assembly views of FIGS. 1 to 5. FIGS. 6 to 14 are additional views which provide clearer details of individual components, their respective features, and some of their functions. FIGS. 6 to 14 may include sample dimensions of a prototype embodiment; these dimensions are purely illustrative and are not limiting unless explicitly recited in the claims. The illustrated classifier and its derivatives and variants are scalable and can assume a variety of dimensions, both larger and small than those identified in FIGS. 6 to 14. Although the classifier is scalable, it should be appreciated that relatively small dimensions are a significant advantage of preferred embodiments. When reading the following descriptions of FIGS. 6 to 14, it may be useful to revisit FIGS. 1 to 5 to see how each individual component contributes synergistically to the overall assembly.

Figure 6A:
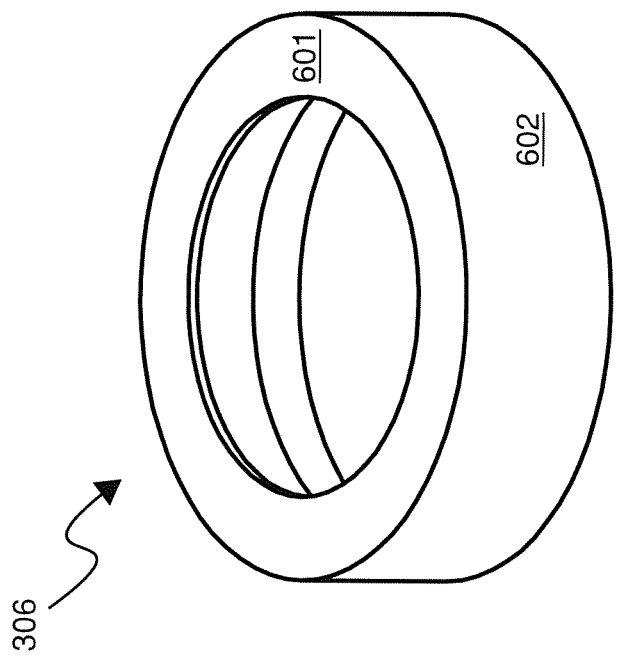
FIGS. 6A to 6C show, respectively, an isometric view, top view, and side view of an electrically insulative top case part.
Figure 6B:
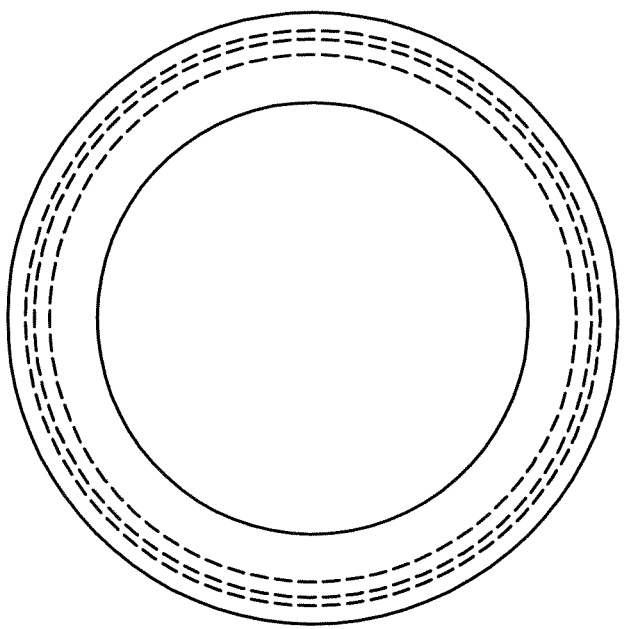
Figure 6C:
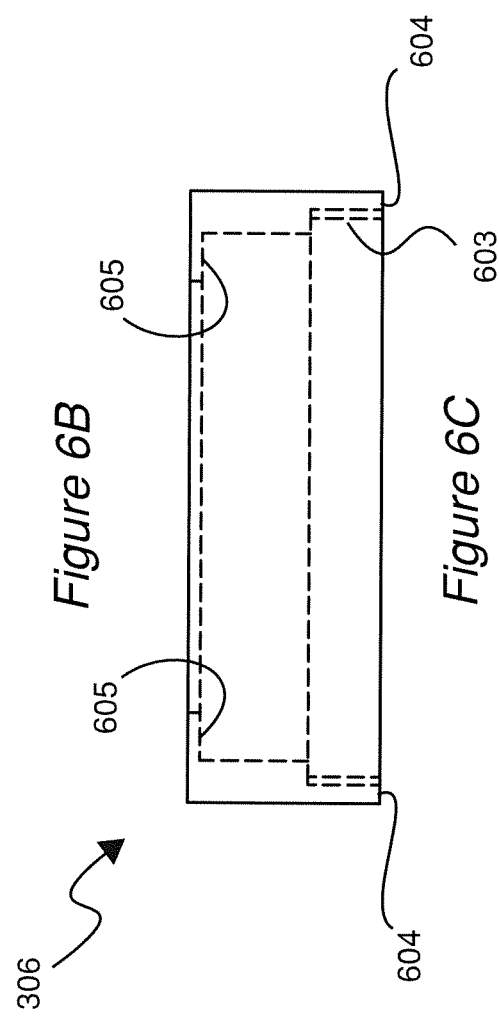

FIGS. 6A, 6B, and 6C show an exemplary top case part 306. In the sample embodiment, the top case part 306 is cylindrically symmetrical about a center axis. A top outer surface 601 and side outer surface 602 function as electrically insulative outer surfaces of the fully assembled classifier 101 and system 100. An inner diameter 603 is configured (e.g., sized) to friction fit with a bottom case part 414 (see FIG. 3). An annular flange 604 of the top case part 306 is configured to overlap with and grip an annular surface of the bottom case part 414. The top case part 306 is manufactured from an electrically insulative material with high stiffness and dimensional stability. Thermoplastics such as polyoxymethylene (POM) are particularly suitable. POM is commonly known by the namebrand Delrin®, a product of DuPont™.

Figure 7A:
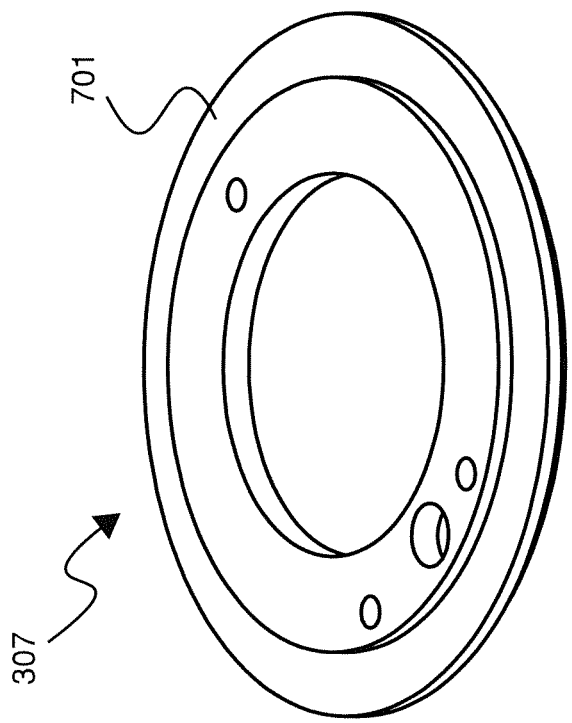
FIGS. 7A to 7C show, respectively, an isometric view, top view, and side view of an electrically insulative top cover part.
Figure 7B:
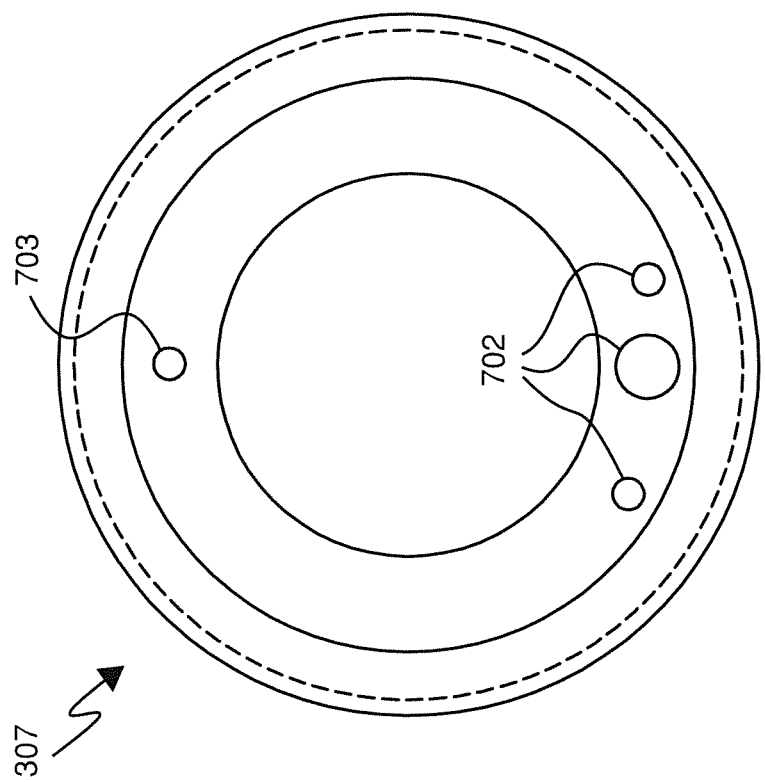
Figure 7C:
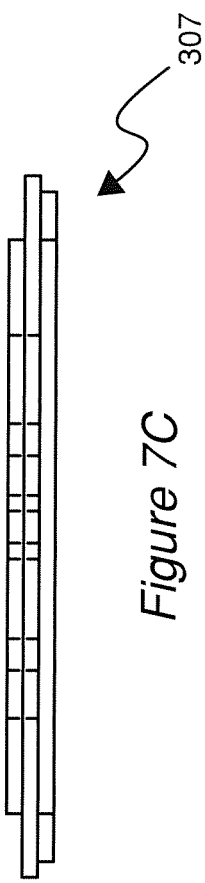

FIGS. 7A, 7B, and 7C show an exemplary top cover part 307. The top cover part 307 may be made of the same material as the top case part 306 such as POM. An annular upward facing outer surface 701 is configured to mate with an annular bottom facing surface 605 of the top case part 306 (see FIG. 6C). Multiple through holes 702 pass through the top cover part 307, the axes of the through holes being parallel with the longitudinal axis of the top cover part 307. The through holes 702 are configured (e.g., positioned and sized) to accommodate the conduits leading to and from the classification channel. An additional hole 703 is provided for passing electrical lead 415 (see FIG. 4).

Figure 8A:
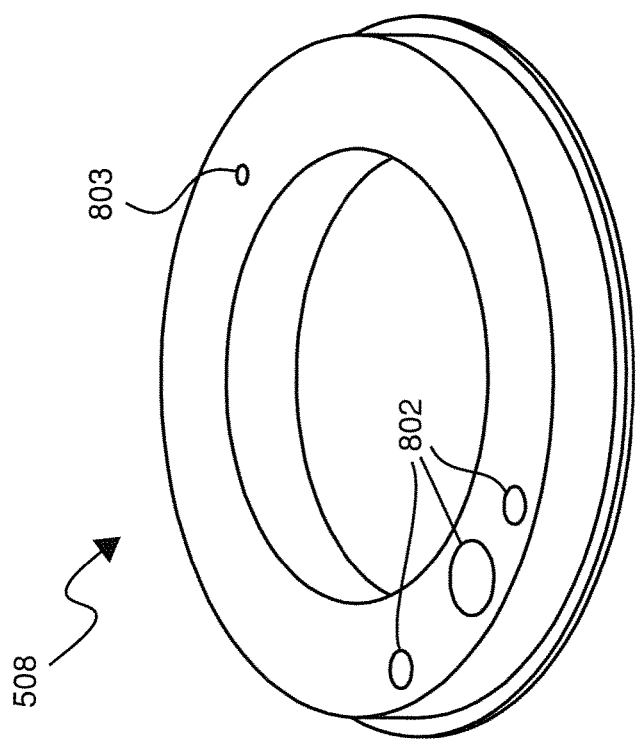
FIGS. 8A to 8C show, respectively, an isometric view, top view, and side view of an electrically conductive inner assembly top cover.
Figure 8B:
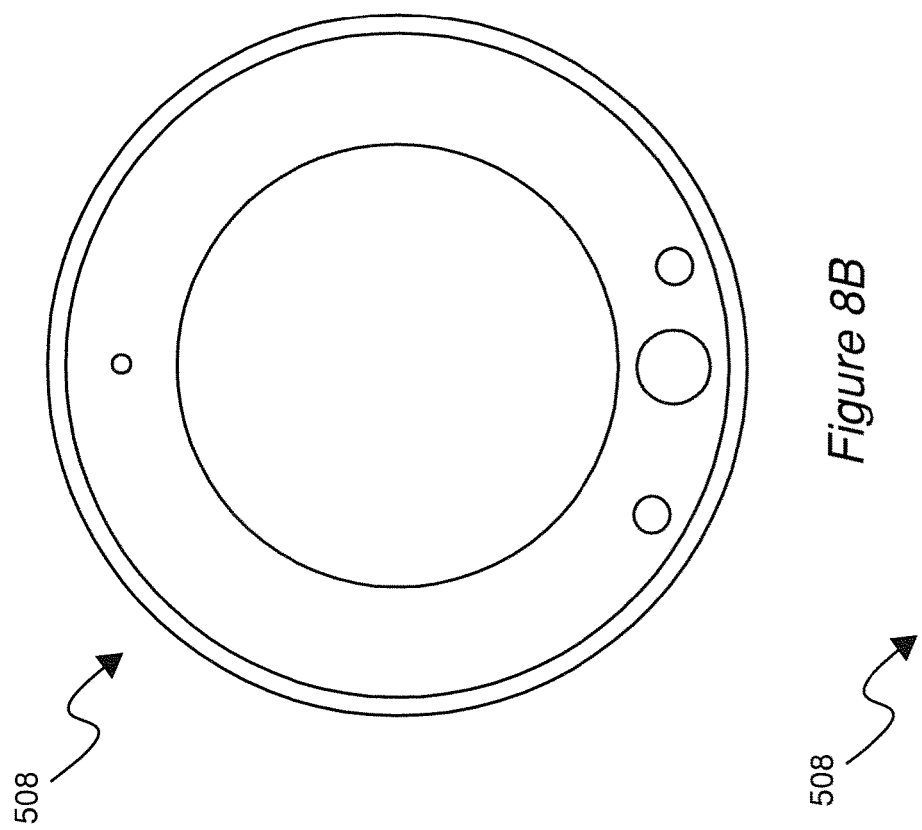
Figure 8C:
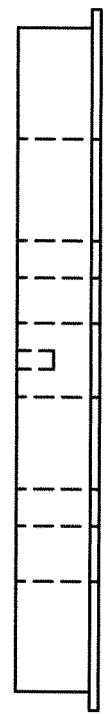

FIGS. 8A, 8B, and 8C show an exemplary inner assembly top cover 508. Like the top cover part 307 arranged immediately above it in the fully assembled state, the inner assembly top cover 508 has multiple through-holes 802 and an additional through-hole 803 are accommodating conduits and an electrical lead, respectively. The inner assembly top cover 508 is the uppermost electrically conductive element of the assembly. Suitable materials are conductive, preferably corrosion resistant, materials. Metals such as stainless steel and aluminum are suitable, for example.

Figure 9A:
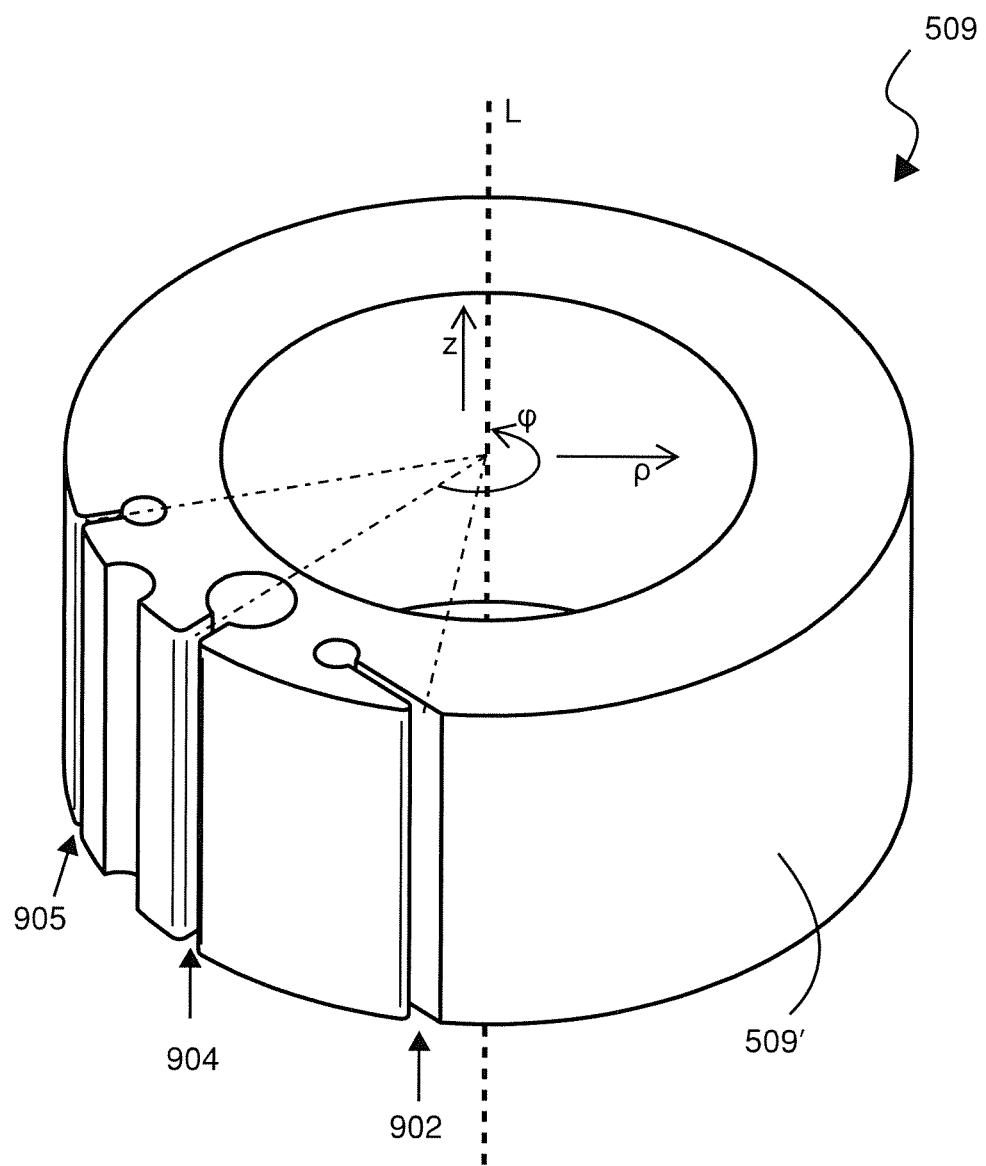
FIGS. 9A to 9C show, respectively, an isometric view, top view, and side view of an inner wall part for the classifier channel.
Figure 9B:
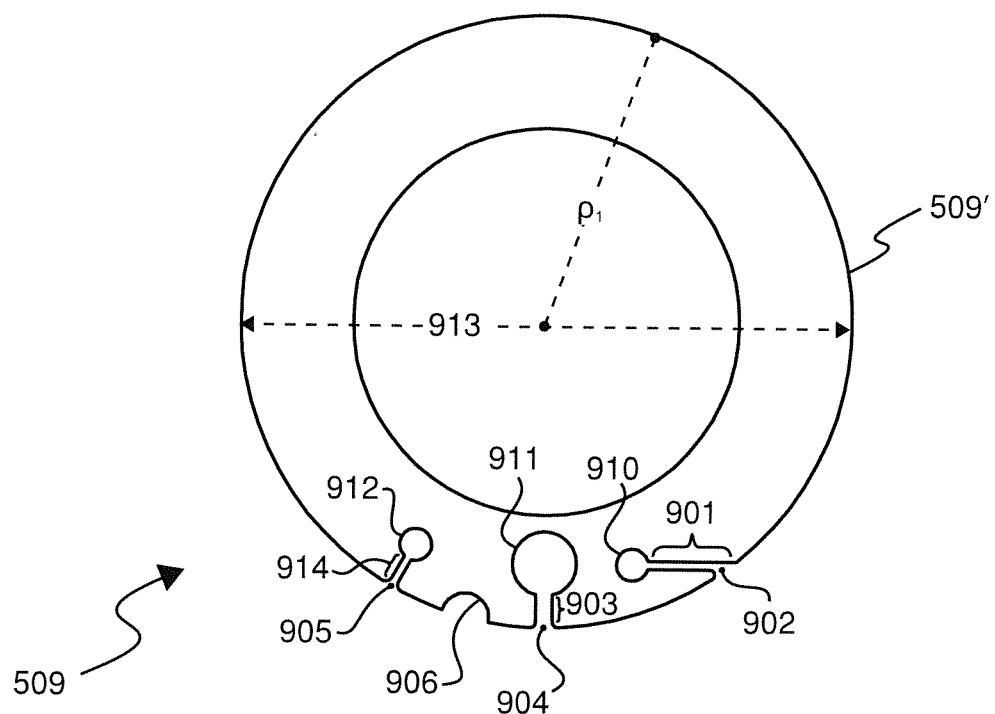
Figure 9C:
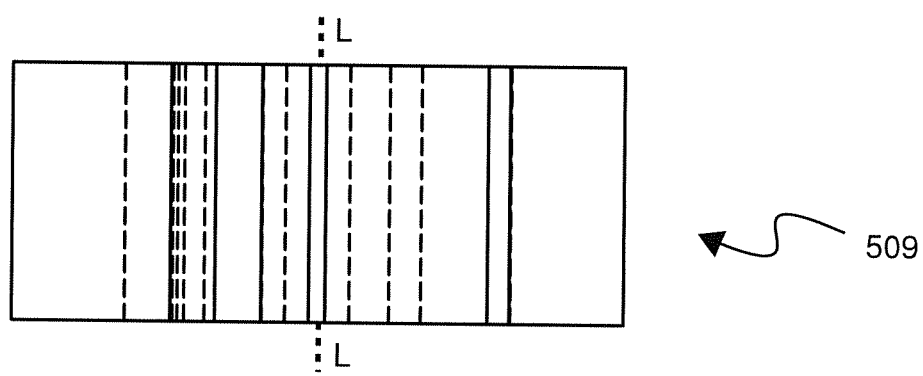

FIGS. 9A, 9B, and 9C show the inner wall part 509. The outer surface 509' of the inner wall part 509 functions as an inner wall of the classification channel. A hole 910 is sized to accommodate a conduit 511 (see FIG. 11A). A hole 911 is sized to accommodate a conduit 513. A hole 912 is sized to accommodate a conduit 513. In alternative embodiments, one or more of the holes 910, 911, and 912 may be configured to serve as a flow conduit or as an extension of a conduit. In such an alternative a conduit may not be arranged inside the respective hole but rather connect to the hole at an end/terminus of the hole. A groove 906 is provided in the wall of the inner wall part 509. The groove 906 is configured to receive a rubber stop 552 (see FIG. 5). In the assembled state of the classifier 101, stop 552 preferably spans both a width and a height of the classification channel, blocking it entirely. The inner wall part 509, or minimally an outer surface 509' thereof, is electrically conductive in order to produce an electric field within the classification channel. A suitable material is a metal such as aluminum or, alternatively, stainless steel.

FIG. 9A shows how the inlet port 902 is configured with the shape of a slot or slit. The slot is generally rectangular in shape, an alternative to which is a rounded slot. The port 902 spans the full width of the classification channel in the fully assembled state (see FIG. 15 for distinction between channel width and channel height). This has an advantage that particles of an aerosol admitted to the classification channel are admitted along an entire width of the channel and thus the entire channel width is usable for classification. The sheath inlet port 904 and outlet port 905 are similarly configured as slots or slits spanning the entire width of the classification channel in the fully assembled state. The slots of the various ports notably take discrete angular positions about the circumference of the classification channel. For instance, a port 902 is a slot opening that spans on a few degrees in the angular direction (the width of the slot as measured in the angular direction φ is 15 degrees or less, 10 degrees or less, 5 degrees or less, 4 degrees or less, 3 degrees or less, 2 degrees or less, 1 degree or less).

Figure 10A:
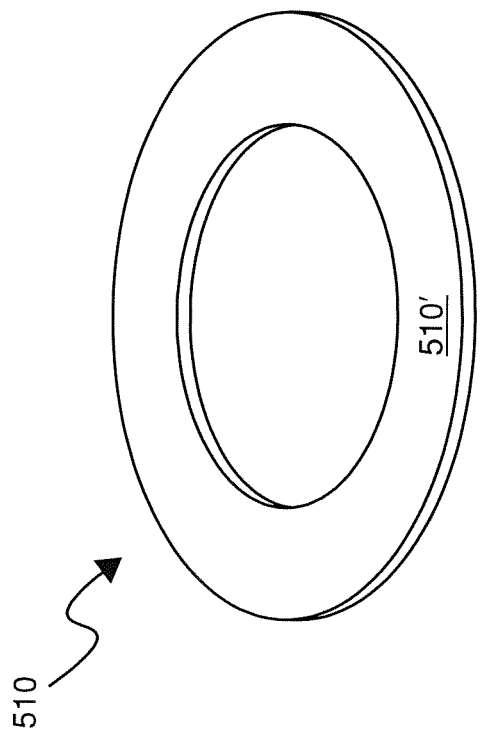
FIGS. 10A to 10C show, respectively, an isometric view, top view, and side view of an electrically conductive inner assembly bottom cover.
Figure 10B:
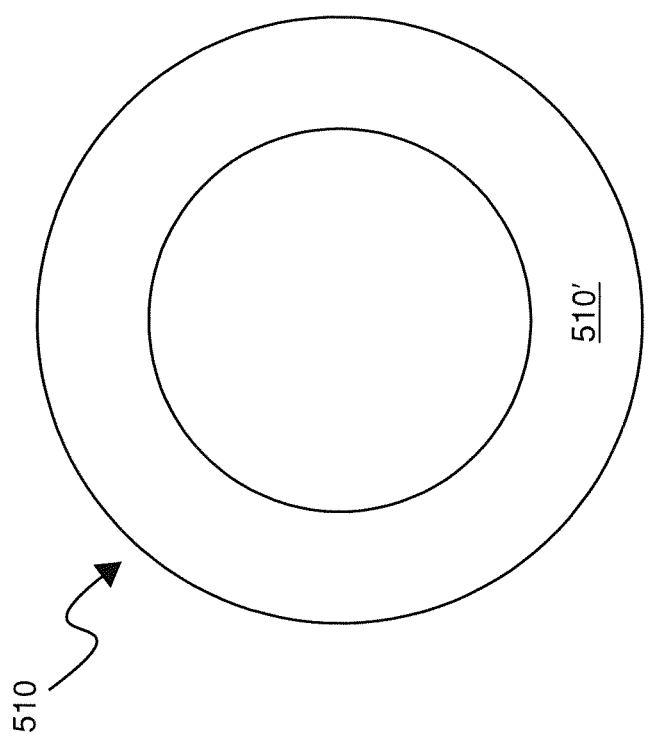
Figure 10C:
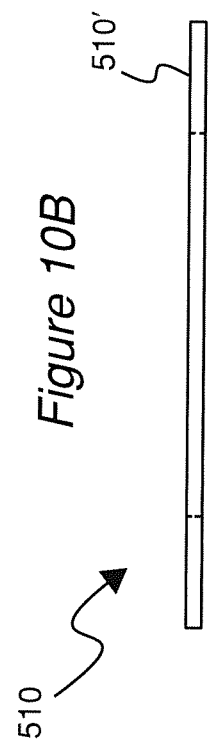
Figure 11B:
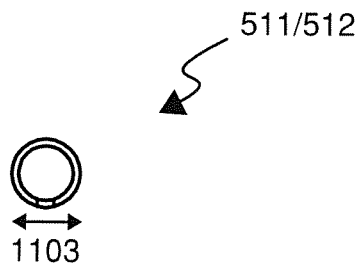
FIGS. 11A to 11C show, respectively, an isometric view, top view, and side view of an aerosol inlet or outlet conduit.
Figure 11A:
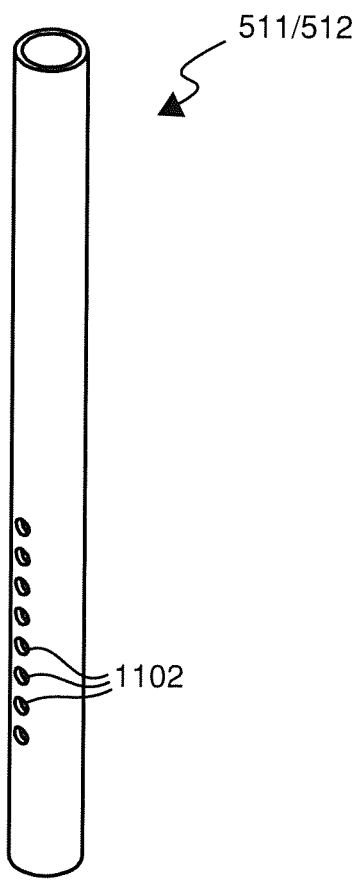
Figure 11C:
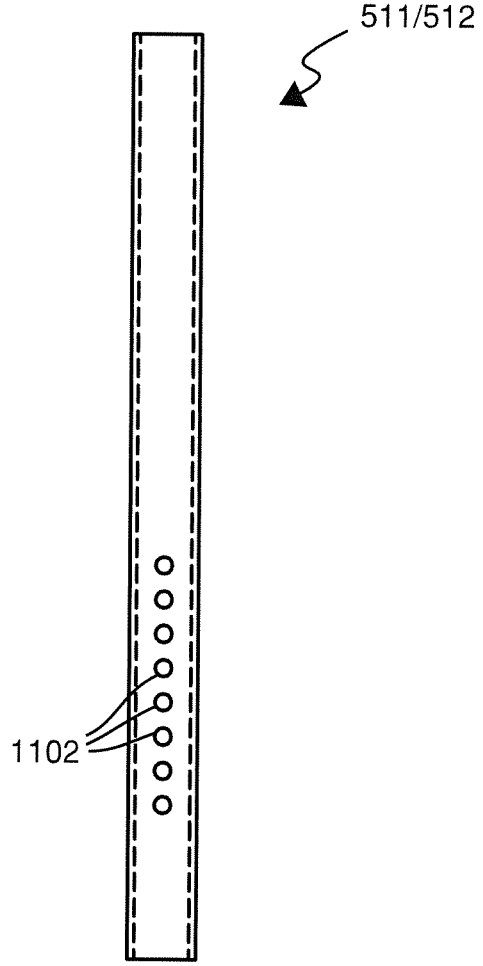
Figure 12B:
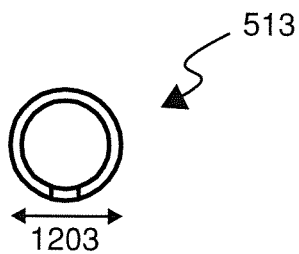
FIGS. 12A to 12C show, respectively, an isometric view, top view, and side view of a sheath inlet conduit.
Figure 12C:
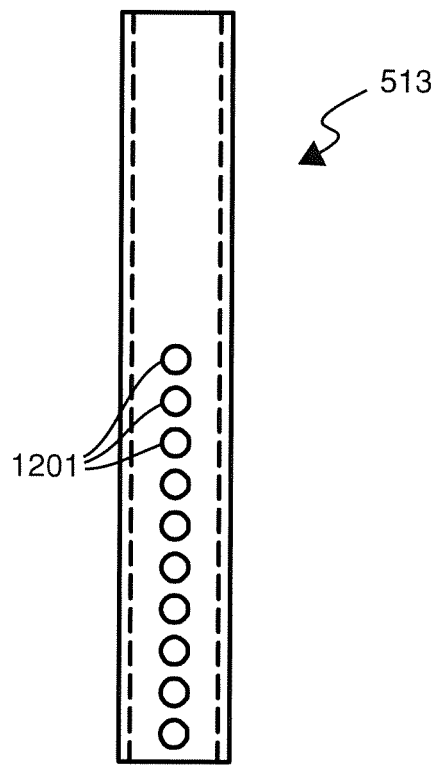
Figure 12A:
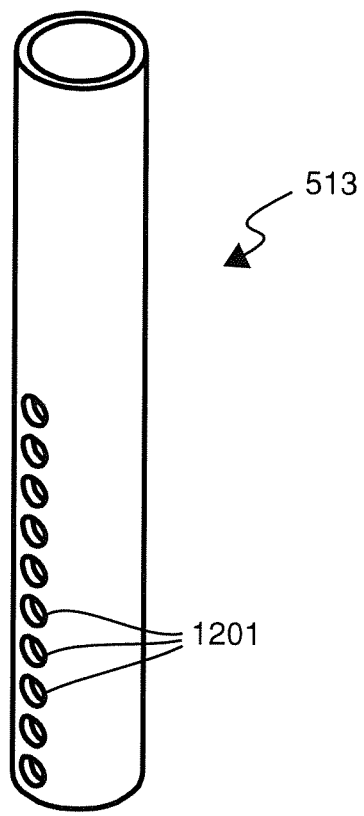

FIGS. 10A, 10B, and 10C show an inner assembly bottom cover 510 with an upper surface 510'. Inner assembly bottom cover 510 caps the end of flow channels embedded in the inner assembly in order to avoid flow leak. The bottom cover 510 is one of two end caps for the inner wall part.

FIGS. 11A, 11B, 11C, and 11D show a conduit 511/512. For the exemplary prototype embodiment illustrated and described herein, conduits 511 and 512 are structurally identical but are configured for different purposes based on their arrangement within the complete assembly of the classifier 101 and system 100. The conduits 511/512 have one or more holes configured to permit passage of a flow containing particles. The outer diameter 1103 of a conduit 511/512 substantially corresponds with the inner diameter of a hole 910/912 (see FIG. 9B). A suitable material for conduits 511/512 is stainless steel.

FIGS. 12A, 12B, 12C, and 12D show a conduit 513. The outer diameter 1203 substantially corresponds in size with the inner diameter of the hole 911 in the inner wall part 509 (see FIG. 9B). The conduit 513 includes one or multiple holes configured to permit passage of a flow such as a sheath flow.

Figure 13A:
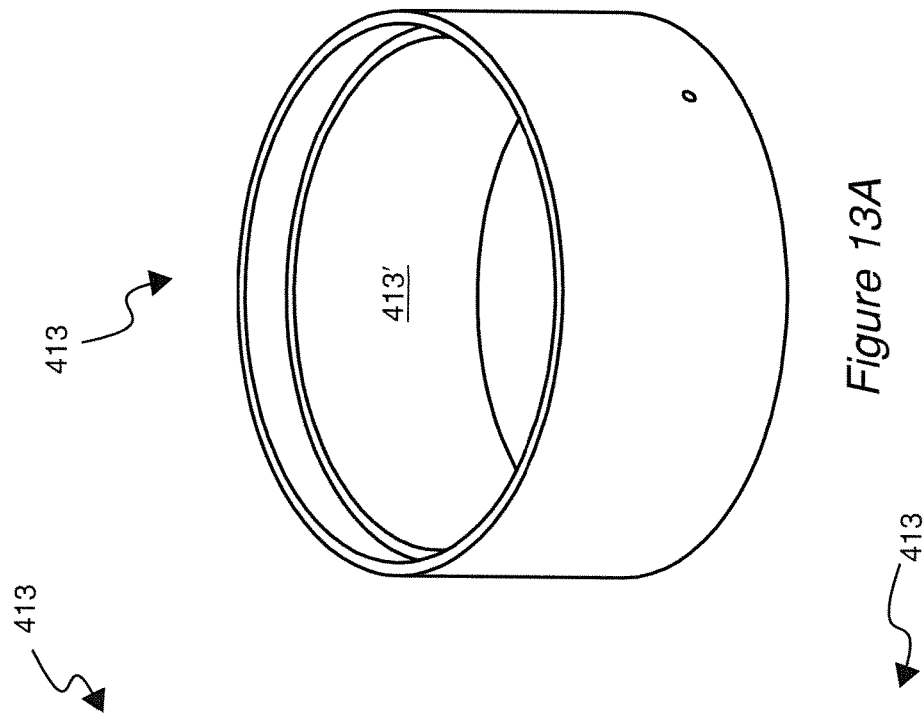
FIGS. 13A to 13C show, respectively, an isometric view, top view, and side view of an outer wall part for the classifier channel.
Figure 13B:
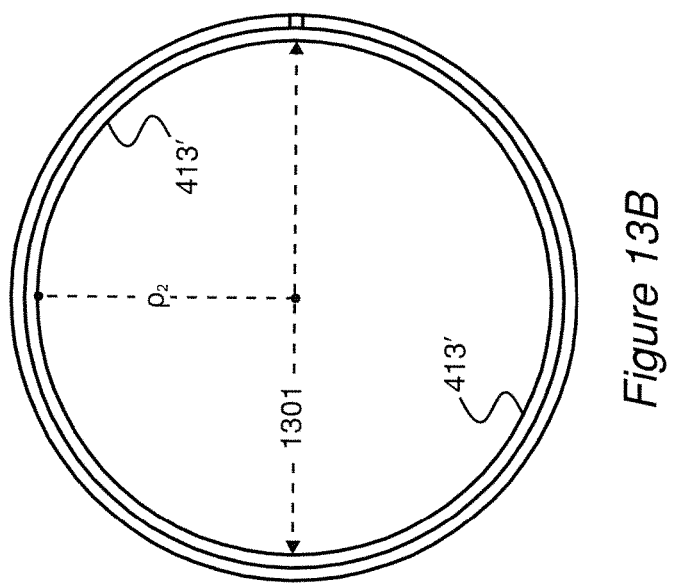
Figure 13C:
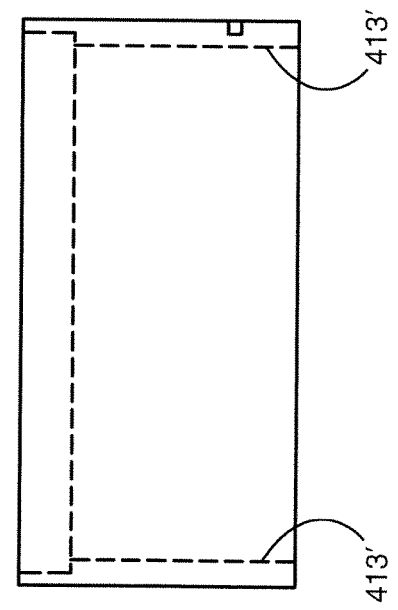

FIGS. 13A, 13B, and 13C show an outer wall part 413. The inner surface 413' functions as on outer wall of the classification channel. The inner diameter 1301 of the outer wall part 413 is larger than the outer diameter 913 of the inner wall part to allow the inner wall part 509 to nest coaxially within the outer wall part 413. Half of the difference between the diameters 1301 and 913 defines the cross-sectional height of the classification channel, at least for the annular prototype embodiment illustrated in the figures. The relative positions of the inner and outer wall parts are fixed with respect to one another in the fully assembled state to ensure that the dimensions of the channel are fixed. The outer wall part 413 is charged during operation. Specifically, the surface 413' is electrically conductive in order to produce an electric field within the classification channel. A suitable material for the surface 413' as well as for the inner wall part 413 generally is a metal such as aluminum or, alternatively, stainless steel.

Figure 14A:
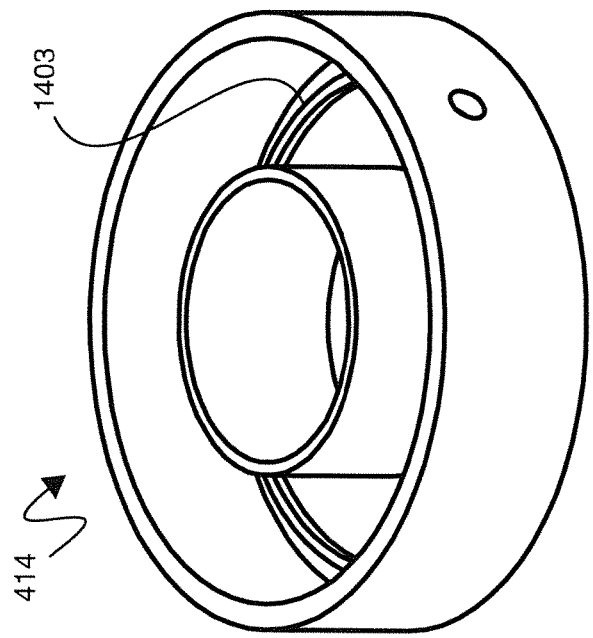
FIGS. 14A to 14C show, respectively, an isometric view, top view, and side view of an electrically insulative bottom case part.
Figure 14B:
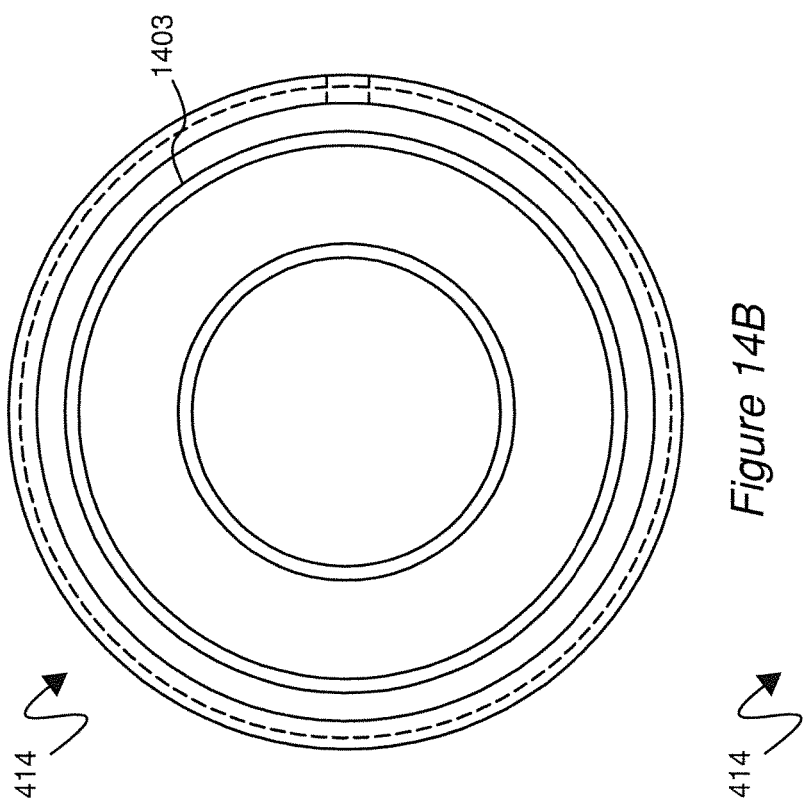
Figure 14C:
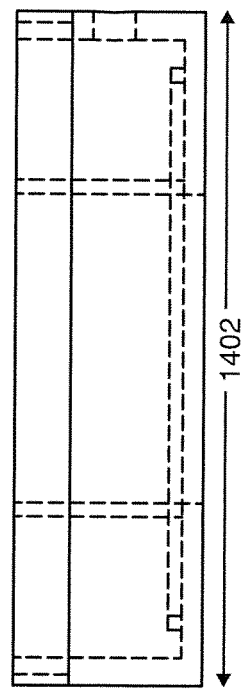

FIGS. 14A, 14B, and 14C show the bottom case part 414 which, together with the top case part 306, form a housing which encompasses, encapsulates, or otherwise surrounds surfaces and edges of the classifier 101 and, in some embodiments, the system 100 generally. The bottom case part 414 is configured to friction fit with the top case part 306. An outer diameter 1402 is configured (e.g., sized) to friction fit with an inner diameter 603 of the top case part 306. The bottom case part 414 is manufactured from an electrically insulative material with high stiffness and dimensional stability. Thermoplastics such as polyoxymethylene (POM) are particularly suitable. POM is commonly known by the namebrand Delrin®, a product of DuPont™. The bottom case part 414 includes an annular protrusion 1403 which functions as a spacer element to maintain a constant channel height. The protrusion 1403 is abutted on either side by the inner and outer wall parts which form the sides of the classification channel. The protrusion 1403 provides dimensional stability to the classification channel at a bottom edge of the channel, while the spacer 338 provides dimensional stability to the classification channel at a top edge of the channel (see Section A-A in FIG. 15).

Figure 15:
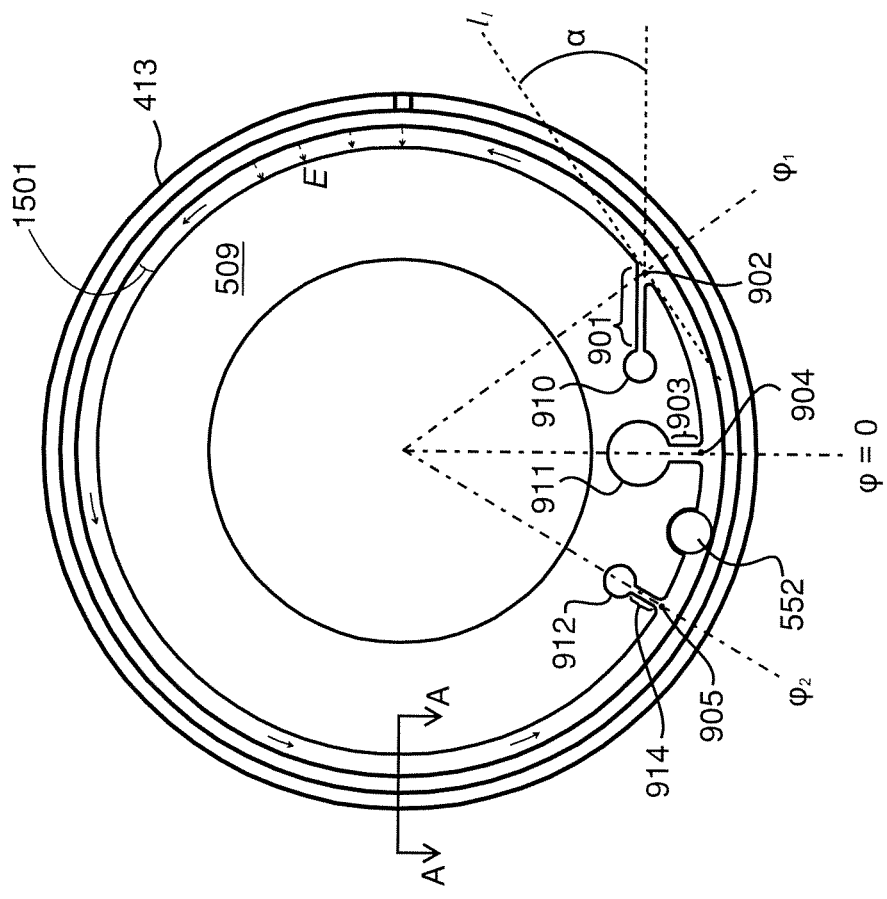
FIG. 15 is shows a classification channel formed by inner and outer wall parts.
Figure 15:
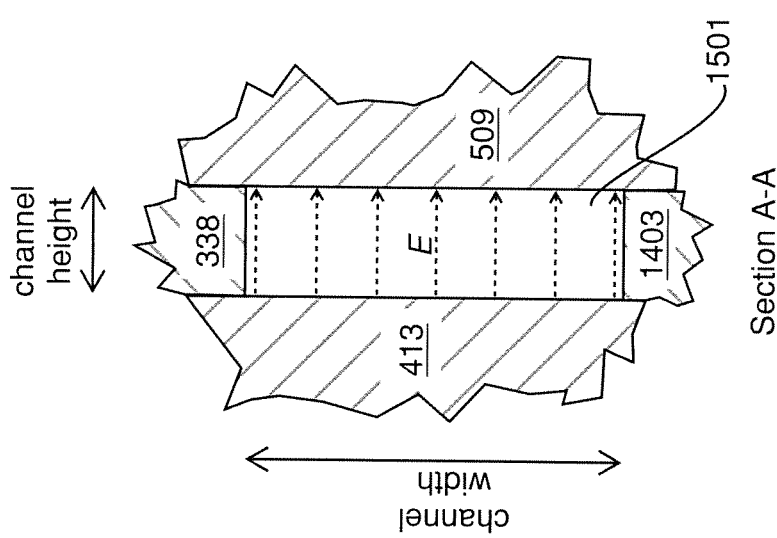

FIG. 15 and its accompanying description explain connections between parts of the assembly with respect to their involvement with the classification channel. FIG. 15 focuses on the relative configurations of assembly parts and resulting operational aspects of the fully assembled device.

FIG. 15 shows the inner and outer wall parts 509 and 413 nested together to form a classification channel 1501. Additional components of the assembly have been omitted for clarity of illustration. In addition, the size of the channel may be differently proportioned (e.g., have a smaller relative height) than is illustrated in FIG. 15. FIG. 15 shows a classification channel 1501 of a relatively large height that facilitates illustration.

The path of aerosol particles through the classification channel 1501 and, in particular, the classification zone thereof can be described using a cylindrical coordinate system that takes advantage of the rotational symmetry of the classifier 101. In a cylindrical coordinate system, points are denoted using the 3-tuple, $(\rho, \varphi, z)$. In the figures, the reference axis is defined as the center longitudinal axis L.

Figure 16A:
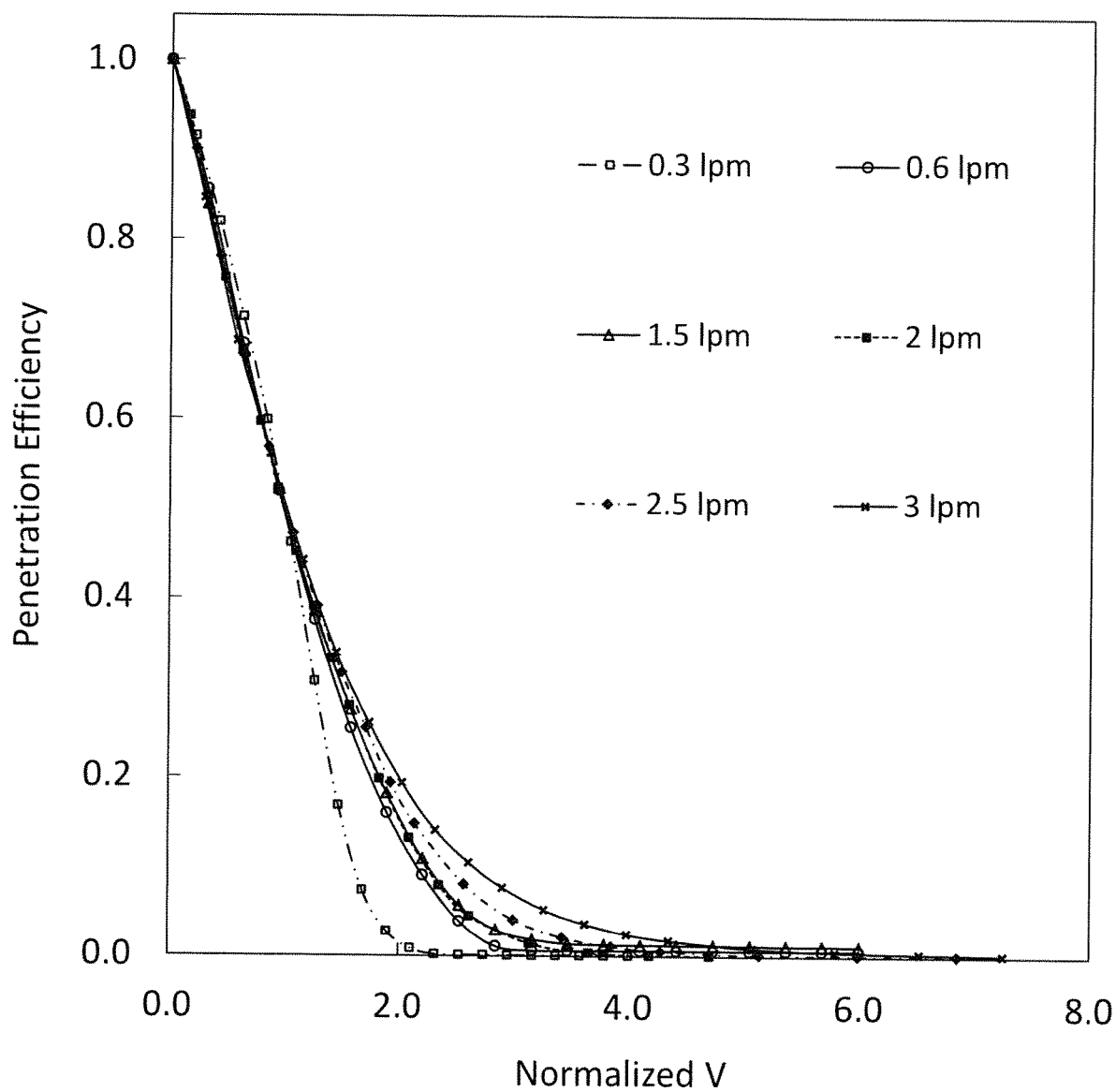
FIG. 16A shows penetration curve of a prototype curved classifier operated at different flow rates for a monodisperse aerosol with particle size of 60 nm.
Figure 16B:
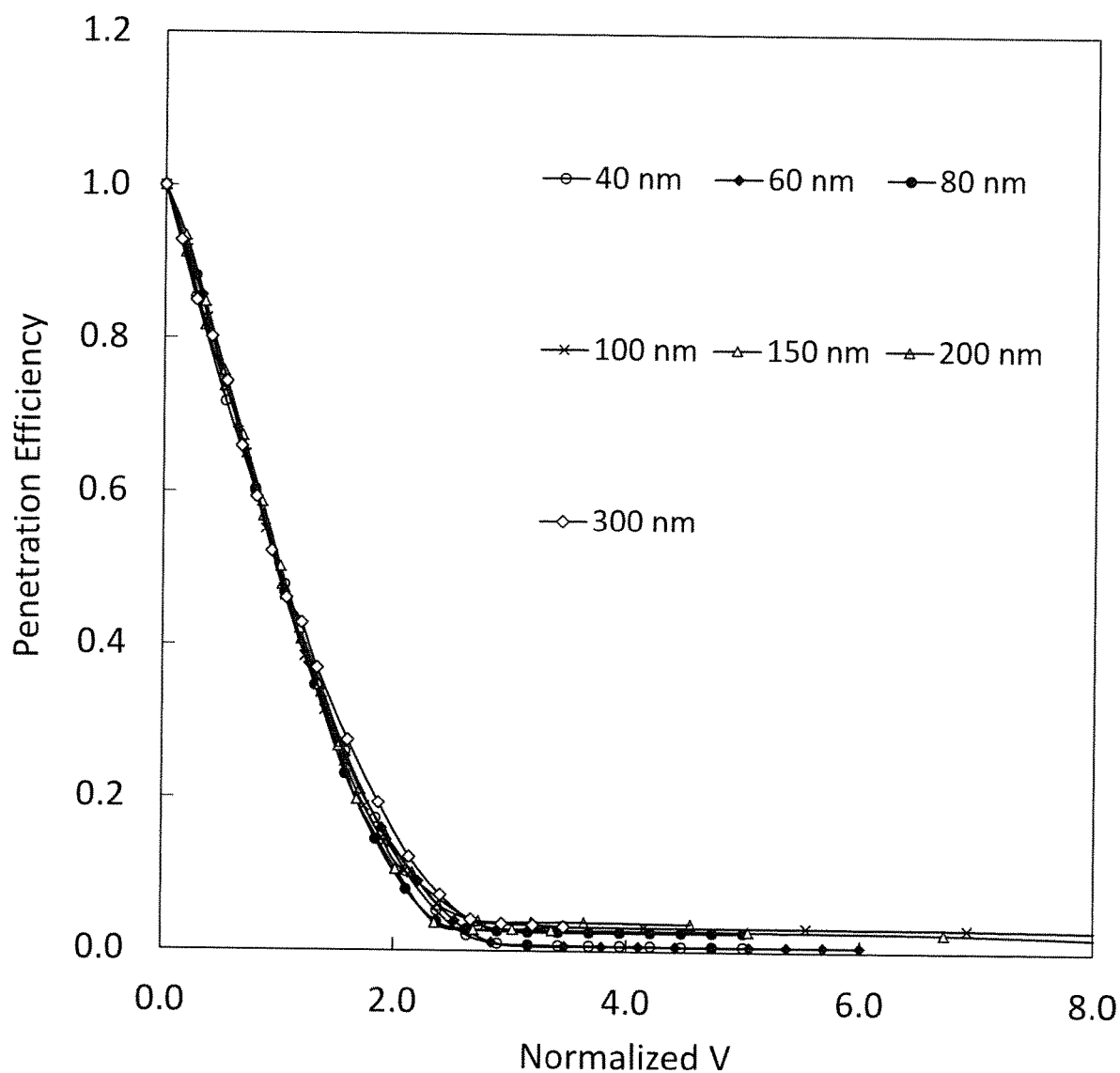
FIG. 16B shows penetration curves of the prototype curved classifier operated at 0.6 lpm flowrate for monodisperse aerosols of different particle sizes.

The Greek letter rho ($\rho$) denotes a position along a radial direction emanating from axis L. The radial boundaries of the classification channel are $\rho_1$ and $\rho_2$, where $\rho_1$ is the outer diameter 913 of the inner wall part 509 and $\rho_2$ is the inner diameter 1301 of the outer wall part 413. For a classification channel or zone of fixed and constant height (e.g., height=$\rho_2-\rho_1$=constant), all or substantially all (e.g., 90% or more, 95% or more, or 99% or more) aerosol particles will at all times have a position p such that $\rho_1 \leq \rho \leq \rho_2$ while the aerosol particle is within the classification zone. The radial position p of a given particle varies in time in response to an electric field induced within the classification channel. Four electric field lines labeled E in FIG. 15 are shown for illustrative purposes within a portion of the classification zone. The cross-sectional cut-out A-A shows a cross-section of the classification channel in an area of the classification zone and also illustrates electric field lines. FIG. 15 shows only a few electric field lines to avoid encumbering the drawing, but it should be appreciated that an electric field is generated for the entire classification zone and thus electric field lines can be drawn around most of the circumference in FIG. 15. As can be appreciated from FIG. 15, the electric field lines are generally directly in purely radial directions. The direction or polarity of the electric field depends on which of the inner and outer wall parts is charged positively or negatively. Particles with mobilities higher than a set/predetermined value are deposited inside the classification channel during classification of a polydisperse aerosol. The set value is controlled by the selection of an appropriate applied voltage, which changes the strength of the electric field E in the classification channel, in particular the classification zone thereof.

The Greek letter phi ($\varphi$) denotes a circumferential/angular position, e.g., between a channel inlet port and an outlet port. The angular boundaries of the classification zone are defined as $\varphi_1$ and $\varphi_2$, where $\varphi_1$ is the angular position corresponding with the aerosol inlet port 902 and $\varphi_2$ is the angular position corresponding with the aerosol outlet port 905. For a circular classification path, the maximum distance traveled by an aerosol particle (which generally corresponds with or approximates a classification path length or classification channel length) is the arc length between $\varphi_1$ and $\varphi_2$. Arc length is defined as: $s=2\pi R(\varphi_2-\varphi_1)/360$, where $\rho_1 \le R \le \rho_2$. The value of R can be approximated as the average of $\rho_1$ and $\rho_2$. For a helical classification path, the maximum distance traveled by an aerosol particle in a classification zone is $2\pi R(n+(\varphi_2-\varphi_1)/360)$, where $\rho_1 \le R \le \rho_2$ and n is the number of complete rotations made by the particle. Again, the value of R can be approximated as the average of $\rho_1$ and $\rho_2$. For a spiral classification path, the general equation for determining maximum distance traveled is the same as for a helical classification path, with the notable exception that R assumes a value between the radius of the largest turn of the spiral and the radius of the smallest turn of the spiral. The angular position (p of an aerosol particle changes with time in response to the total flow rate in the classification channel. The total flow rate results from the combination of aerosol flow rate and sheath flow rate. The change of the angular position $\varphi$ of an aerosol particle over time is non-random and is primarily based on the total flow rate.

The letter (z) denotes a position along the direction corresponding with axis L. For annular (e.g., circular) and spiral classification channels, a particle's z position is assumed to be substantially constant while in the classification zone. However, a helical classification channel involves a progressively decreasing or increasing z position as any given particle moves from the aerosol inlet port toward the aerosol outlet port via the classification channel.

A polydisperse aerosol is transported inside the classifier by a conduit 511. In an exemplary embodiment, the conduit is arranged such that its primary longitudinal axis is parallel with the longitudinal axis L of the classifier. The conduit 511 has one or a plurality of openings 1102 (see FIGS. 11A and 11C) which are fluidically connected with a channel 901 of the inner wall part 509 (see FIGS. 9A to 9C). The channel 901 fluidically connects the conduit 511 to the port 902, which is an opening into the classification channel 1501. In the illustrated exemplary embodiment, the channel 901 and port 902 are configured to introduce aerosol flow to the classification channel at a non-zero angle $\alpha$ with respect to a line, $l_1$, that is tangent to the inner wall at the center of port 902 (line $l_1$ is also tangent to the classification channel at the inlet port). It is preferable that angle $\alpha$ is less than 90 degrees (i.e., is not a right angle). It is more preferable that angle $\alpha$ is less than or equal to 75 degrees, even more preferably less than or equal to 60 degrees, most preferably less than or equal to 45 degrees. A relatively small angle $\alpha$ assists in achieving laminar aerosol flow within the classification channel and, importantly, the classification zone thereof.

In an alternative configuration, the channel 901 can be omitted, in which case the opening(s) of the conduit 511 may be collocated or in fact the same structure as the inlet port 902. An advantage of omitting the channel and admitting an aerosol from the conduit 511 directly to the classification channel is reduced structural complexity to the aerosol pathway. Conversely, a channel 901 is preferable in some embodiments because it offers the advantage of stabilizing aerosol flow (e.g., reducing turbulence)/improving aerosol flow direction uniformity after the aerosol exits the conduit 511 but before it is admitted to the classification channel 1501.

In FIG. 15, the stop 552 is shown spanning the height of the classification channel 1501, blocking it entirely. The stop 552 is configured and arranged within the classification channel to block flow in a clockwise direction from the inlet ports to the outlet port. In other words, flow in the channel is configured to be unidirectional by the combined arranged o the inlet ports, outlet ports, and the stop 552. The counterclockwise rotational path of aerosol particles is indicated in FIG. 15 by small arrows running counterclockwise in the classification channel 1501 from the inlet port 902 to the outlet port 905. A suitable material for the stop 552 is an elastic polymer such as a rubber.

Sheath flow is also introduced to the classification channel through a configuration involving a conduit, opening, channel, and port. Specifically, sheath flow passes through conduit 512, exits the conduit at one or more openings 1201 to enter the channel 903. The channel 903 directs the sheath flow to the port 904, which admits the sheath flow to the classification channel. As evident from FIG. 15, the port 902 is arranged $\varphi_1$ degrees clockwise with respect to aerosol flow inlet port 904. The sheath flow is guided through a portion of classification channel which is approximately measured as $\pi\rho_1\varphi_1/180$, the arc length of the inner wall between the centers of aerosol flow inlet port 902 and the sheath flow inlet port 904. After traversing this portion of the classification channel, sheath flow is substantially laminar at the aerosol flow inlet port 902. This has the advantage that aerosol particles are subjected only to laminar sheath flow in the classification zone.

Only classified particles reach the end of the classification zone, all other particles generally being deposited on walls of the channel. The classification zone ends at the outlet port 905. Classified particles exit the classification zone at outlet port 905 and subsequently the entire classifier by way of channel 914, openings 1102, and conduit 512.

Section A-A of FIG. 15 shows a cross-section of a classification channel 1501 and identifies the structures which define walls, roofs, and floors of the channel in an exemplary embodiment. In some exemplary embodiments, channel height is ⅛ inch or less. In some embodiments, channel "height" is used to describe the distance between the surfaces/walls which function as electrodes for the electric field. As a result, "height" is parallel with electric field lines as shown in Section A-A of FIG. 15. Channel "width" is orthogonal to the electric field and the direction of flow. In Section A-A, the direction of flow is directed out of the page.

FIGS. 16A to 16B and 17A to 17C and their accompanying descriptions illustrate and describe sample performance data collected from a working prototype that generally corresponds with the exemplary embodiment illustrated in FIGS. 1A to 15. The classifier was operated in two different modes or configurations: precipitation and electrical classification.

FIGS. 16A and 16B show data collected from a prototype classifier operating as a particle precipitator (i.e., in a particle precipitation mode). Charged aerosol particles were introduced to the classification channel from the aerosol inlet without sheath flow (e.g., sheath flow inlet was blocked). A particle passing through the channel with the applied electric field exited from a (classified or monodisperse) aerosol outlet. Particles with mobilities higher than the set value (according to applied voltage) deposited inside the classification channel.

FIG. 16A shows penetration curves of a classifier 101 for a monodisperse aerosol with (average) particle size of 60 nm. Each of the six curves corresponds with a different flow condition (i.e., flow volume, in liters per minute), as indicated by the key. The flow conditions were in the range of 0.3 lpm to 3.0 lpm. The plot shows (normalized) penetration efficiency as a function of normalized voltage. For all flow conditions, the penetration curves decrease almost linearly in response to increased applied voltage. This result is consistent with the performance of classifiers in conventional designs, meaning that a classifier 101 according to the present disclosure may perform at least as well if not better than existing classifiers. At low applied voltage (e.g., below 2.5), the curve for 0.3 lpm shows appreciably lower penetration efficiency as compared to the remaining five curves. This result suggests that a suitable lower limit for flow rate at low applied voltages may be 0.3 lpm. The results depicted in FIG. 16A also suggest a maximum operational flow rate may be at least 3 lpm, if not greater. FIG. 16A shows that the higher the flow rate the longer the tail found in the high voltage range. As expected, larger particles require higher voltage than smaller particles to achieve the same penetration.

FIG. 16B shows penetration efficiency as a function of normalized applied voltage for different sized monodisperse aerosols, all of which were subjected to a 0.6 lpm flowrate. Normalizing voltage permits direct comparison of penetration efficiencies by eliminating the visual effect of aerosol particle size within the graph. The close overlap of all seven curves in FIG. 16B shows that the prototype classifier performs substantially the same for any submicrometer particle size (e.g., as small as 40 nm or as large as 300 nm according to this specific experimental setup). In other words, the results illustrated in FIG. 16B demonstrate that a classifier 101 according to this disclosure is capable of differentiating particles (e.g., submicrometer particles) of different sizes by their electrical mobilities.

Figure 17A:
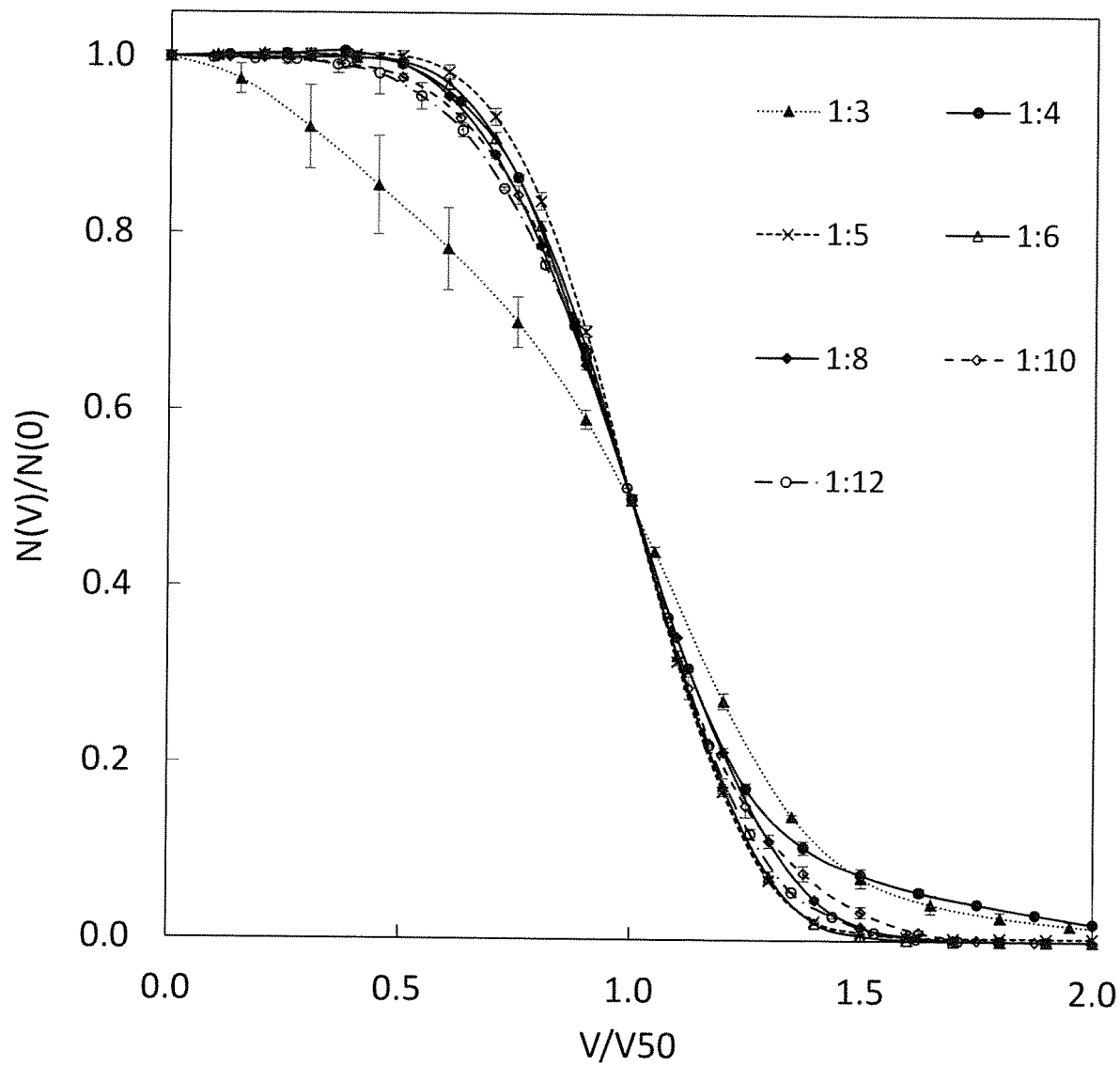
FIG. 17A shows penetration curves of the prototype curved classifier operated at a total flowrate of 1.8 lpm with aerosol to sheath flow rate ratio from 1:3 to 1:12 for 100 nm particles.
Figure 17B:
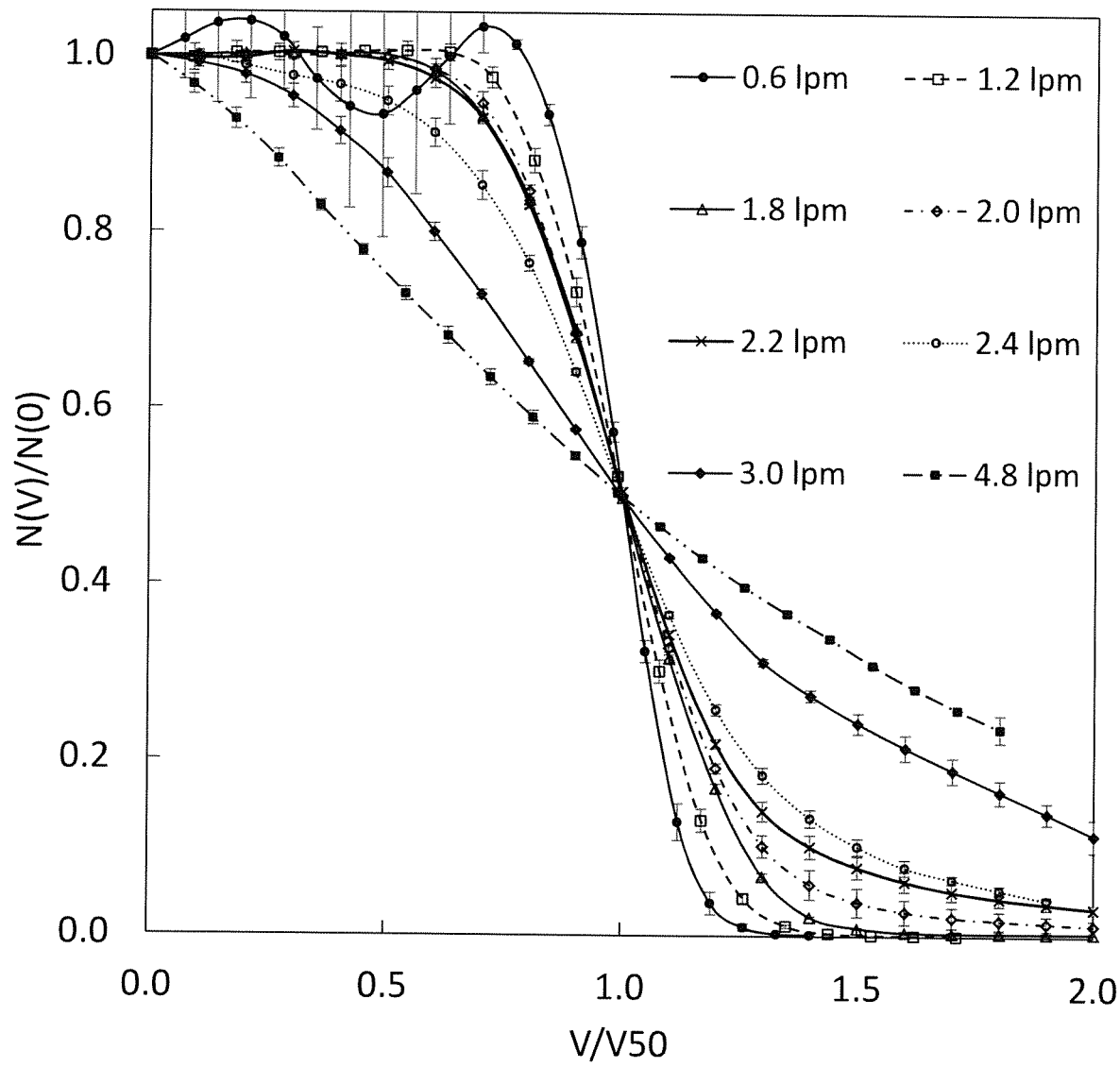
FIG. 17B shows penetration curves of the prototype curved classifier operated at various total flowrates but with a constant aerosol to sheath flowrate ratio 1:5 for 100 nm particles.
Figure 17C:
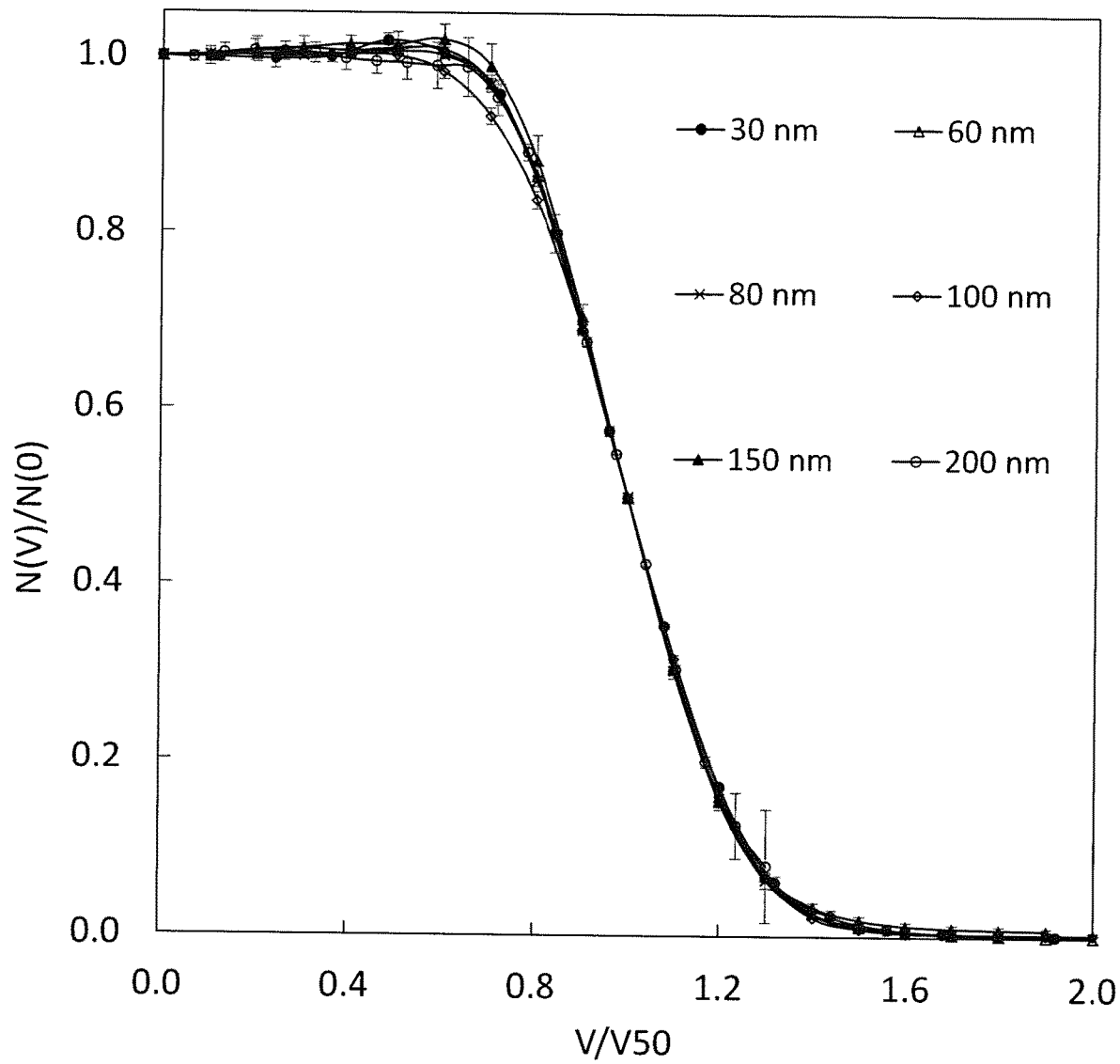
FIG. 17C shows penetration curves of the prototype curved classifier operated at a total flowrate of 1.8 lpm and aerosol to sheath flowrate ratio for monodisperse aerosols with particle sizes from 30 nm to 200 nm.

FIGS. 17A, 17B, and 17C show data collected while operating a prototype classifier as a particle electrical mobility classifier (i.e., in a separator mode). To operate the prototype in the separator mode, aerosol particles were introduced in the (polydisperse) aerosol inlet and particle-free flow was introduced by the sheath flow inlet. The total flow exited from a single outlet.

To comprehensively evaluate the performance of the prototype classifier, three key effects were carefully tested: aerosol to sheath flow ratio effect, total flow rate effect, and particle size effect. The experimental setup and procedure are based on Li's work (Li et al., "A miniature disk electrostatic aerosol classifier (mini-disk EAC) for personal nanoparticle sizers," Journal of Aerosol Science 40, Elsevier Ltd., 2009, pp. 982-992), which is incorporated herein by reference. Given the geometry of the prototype classifier, its performance at a fixed operational flow rate was characterized by its transfer function, which describes the particle penetration efficiency as a function of applied voltage.

FIG. 17A shows the penetration curves for a monodisperse aerosol of 100 nm particles passed through the prototype classifier at a constant total flow rate of 1.8 lpm with various aerosol-to-sheath flow rate ratios. The ratio indicated in the figure legend are expressed as (aerosol flow rate):(sheath flow rate). As expected, the steepness of the penetration curves increased with the decrease of the aerosol-to-sheath flow rate ratio. In particular, the steepness appreciably increased when the ratio was 1:5 or greater. For smaller aerosol-to-sheath flow rate ratio cases, however, the trend is inversed. The conclusion drawn from these observations is that for the prototype embodiment tested, the best sizing resolution of the classifier was under the condition of an aerosol-to-sheath flow rate ratio of 1:5. In the field of classifiers, a 1:5 ratio represents a relatively low sheath flow rate. However, this is sufficient for particle sizing for miniature sensors/monitors. In general, miniaturization of the overall classifier comes as a tradeoff with maximum sheath flow rate (and therefore classification efficiency, the rate at which an aerosol stream is classified).

FIG. 17B shows the penetration curves of a monodisperse aerosol of 100 nm particles passed through the prototype classifier operated at various total flowrates with constant aerosol-to-sheath flow rate ratio of 1:5. Because of the centrifugal effect at different flowrates, the penetration curves do not merge into one. In other words, centrifugal effects of the curved classification channel account for some of the differences between the penetration curves. The experimental results of FIG. 17B suggest an optimal total flow rate for operating the prototype classifier between 1.2 lpm and 2.2 lpm. Thus, based on this result, later particle size effect studies using the same prototype utilize a total flowrate of 1.8 lpm and aerosol-to-sheath flow rate ratio of 1:5.

FIG. 17C shows penetration curves for the same prototype classifier for monodisperse aerosols with different sizes ranging from 30 nm to 200 nm, as indicated by the legend in FIG. 17C. As evidenced in FIG. 17C, all of the penetration curves were merged as one after the normalization of the applied voltage with V50. This indicates that the penetration characteristics (or the transfer function) of the studied prototype are size-independent, at least over the tested particle size range at an optimized operational flow condition.

Further, FIG. 17C shows that the larger the particle size, the higher the cutoff voltage, as expected. The relationship between particle size and its cutoff voltage may be determined for subsequent prediction of particle size when using an exemplary classifier 101 for particle measurement.

Figure 18D:
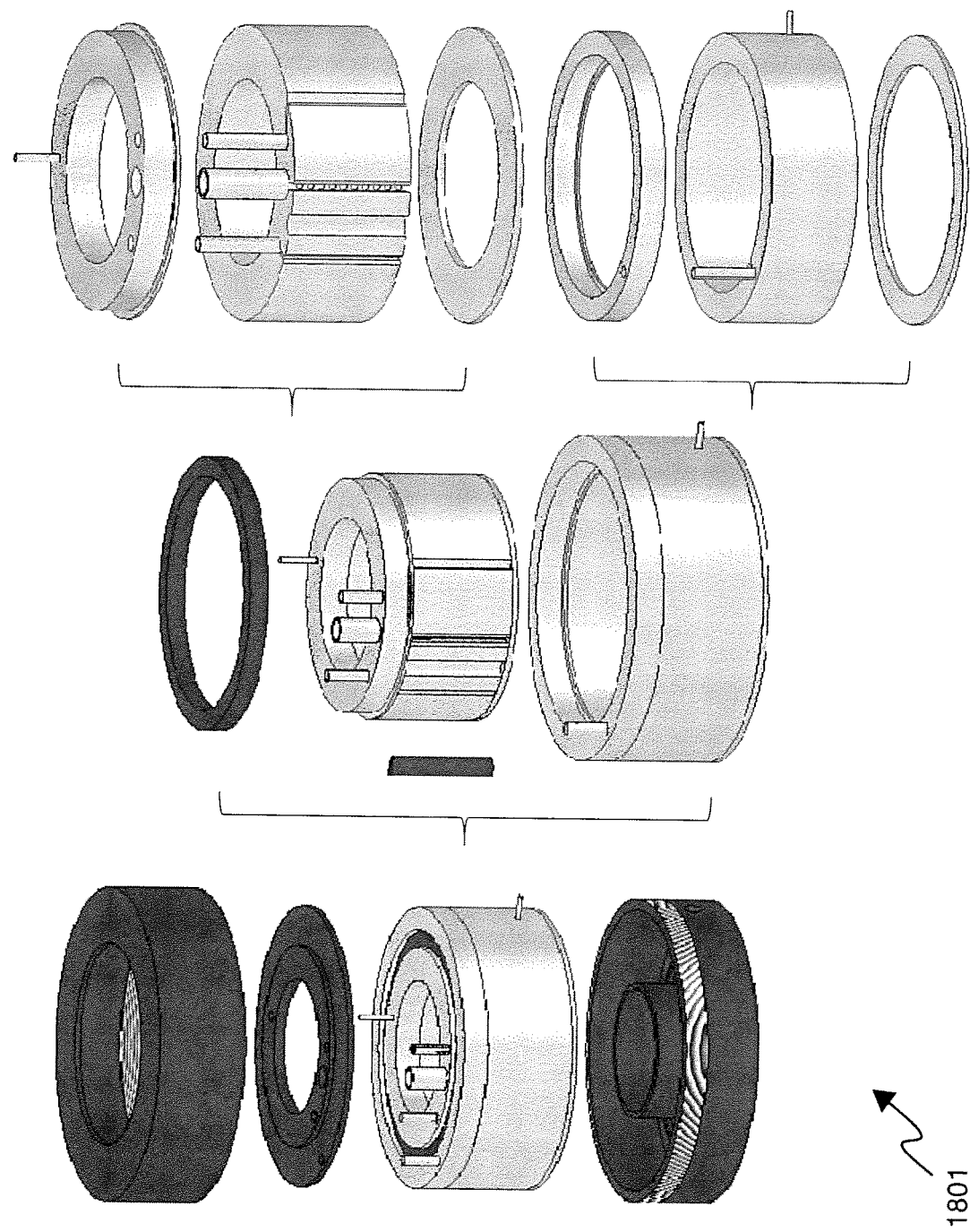

FIGS. 18A to 18C and their accompanying descriptions illustrate and describe an alternative embodiment for a classifier. Most of the central features of the classifier 1801 correspond with the features of classifier 101. A notable distinction is that the classifier 1801 includes both a first outlet port 1802 a second outlet port 1803 from the classification channel 1804. The first outlet port 1802 may be used as a classified aerosol outlet port, while the second outlet port 1803 may be used as an excess sheath flow outlet port, or vice versa in some alternative embodiments. Similar to the classifier 101, there is a polydisperse aerosol inlet 1805 and a sheath flow inlet 1806. Alternative embodiments may have a plurality of inlets and/or outlets which exceed the numbers shown in the drawings.

Figure 19A:
FIGS. 19A to 19D show schematics of different flow paths in a classification channel.

Classification channel configurations and flow paths have been described as being, for example, annular, circular, helical, and spiral. Annular and circular may be treated as generally equivalent. FIG. 19A presents a schematic of an annular or circular classification channel/corresponding flow path. Flow is directed from an (entry/exit) port A to an (exit/entry) port B, or vice versa, depending on a given embodiment. The exemplary classifier 101 described above in connection with many of the figures has an annular or circular flow path such as is depicted in FIG. 19A. It is generally desirable to arrange ports A and B as close together as possible to maximize the flow path distance available for classification. In some embodiments, additional entry and/or exit ports may be included along the classification channel/flow path.

Figure 19B:
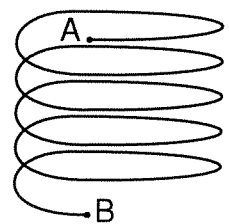

FIG. 19B presents a schematic of a helical classification channel/corresponding flow path. As with FIG. 19A, flow is directed from an (entry/exit) port A to an (exit/entry) port B, or vice versa, depending on a given embodiment. For a helical configuration, the helix may include any number of turns/full rotations (e.g., 2 turns, 3 turns, 5 turns, 10 turns, 20 turns, etc.). In some embodiments, additional entry and/or exit ports may be included along the classification channel/flow path. With a standard helix configuration, each aerosol particle's ρ-position changes only under the effect of an electric field. The classification channel itself does not substantially affect a particle's ρ-position. Conversely, each aerosol particle's z-position changes continuously due to the changing z-position of the classification channel/flow path.

Figure 19C:
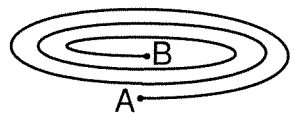

FIG. 19C presents a schematic of a spiral classification channel/corresponding flow path. As with the previous two figures, flow is directed from an (entry/exit) port A to an (exit/entry) port B, or vice versa, depending on a given embodiment. For a spiral configuration, the helix may include any number of turns/full rotations (e.g., 2 turns, 3 turns, 5 turns, 10 turns, 20 turns, etc.). With a standard spiral configuration, aerosol particles do not change z-position in the classification channel/zone. However, each aerosol particle's ρ-position changes both because of the classification channel shape as well as the effect of an electric field.

Figure 19D:

FIG. 19D presents a schematic of a wavy (i.e., waved) classification channel/corresponding flow path. In this context, wavy simply means the two electrodes (i.e., the charged opposing inner/outer wall part surfaces) can be in a wavy line (as long as they are parallel to each other). The wavy path may be, for example, a sinusoidal curve or any other smooth curve.

In some embodiments, a combination of the classification channel configurations described and shown in FIGS. 19A to 19D may be employed. For example, a classifier may exhibit both helical and spiral characteristics, with each turn of the helix having a smaller radius as compared to the prior turn. In all of the configurations shown in FIGS. 19 to 19D, the angular position (φ-position) of aerosol particles changes continuously as they traverse the classification channel and especially a classification zone.

Figure 20:
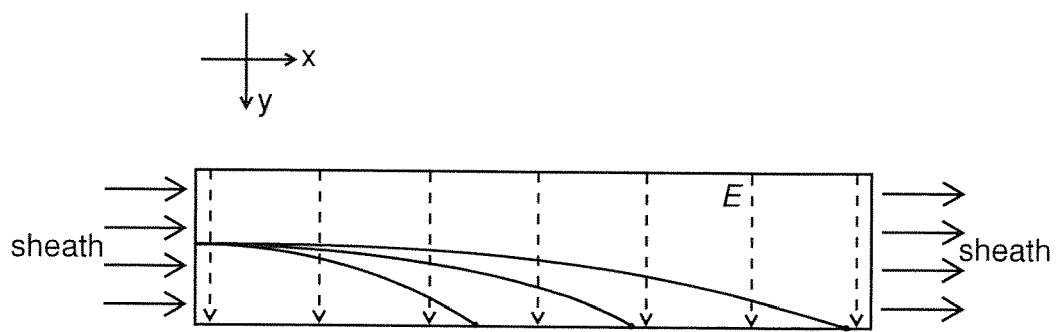
FIG. 20 shows a schematic of particles with different electrical mobilities traveling in a classification zone.

FIG. 20 shows a schematic illustration electrical mobility classification. In the diagram, sheath flow is directed from the left side to the right side of the diagram, driving bulk particle flow in this direction. An electric field is induced orthogonal to the sheath flow direction, which in the diagram is from the top to the bottom. Electric field lines are illustrated as dotted lines in the figure. The electric field provides differential displacement of particles in the classification zone to classify the particles. Three separate particle paths are shown using solid lines. Particles with larger sizes and thus larger electrical mobilities deviate under the electric field faster than particles with smaller sizes and thus smaller electrical mobilities. The leftmost particle path (leftmost solid curve) represents a particle of comparatively large size and mobility. The rightmost particle path (rightmost solid curve) represents a particle of comparatively small size and mobility. The middle particle path (middle solid curve) lies somewhere in the middle as to size and mobility. The applied voltage and thereby the strength of the electric field and the sheath flow/total flow rate are two variables which can be controlled to influence the total distance traveled by any given particle, whatever its size/mobility. Such variables are set so that the particle path (solid line in the figure) of the particle size to be classified corresponds with the location of an outlet of the classification channel.

Figure 21:
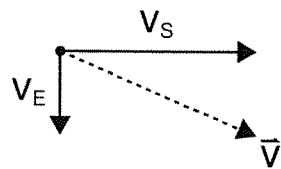
FIG. 21 shows a vector diagram which decomposes a particle's velocity vector into two components, a first component that corresponds with particle movement induced by sheath flow and a second component that corresponds with particle movement induced by an electric field.

FIG. 21 shows a vector diagram which decomposes the velocity vector of a particle traveling in the diagram of FIG. 20. According to the FIG. 20 diagram, charged (aerosol) particles travel with a non-zero/positive velocity in both the x-direction and y-direction. The x-component of velocity is produced by the sheath flow rate or total flow rate. This is represented in FIG. 21 as $v_s$. The y-component of velocity is produced by the electric field and is represented in FIG. 21 as $v_e$. The combination of these two components produces the total velocity vector of a particle (shown as dotted line in FIG. 21).

Figure 22:
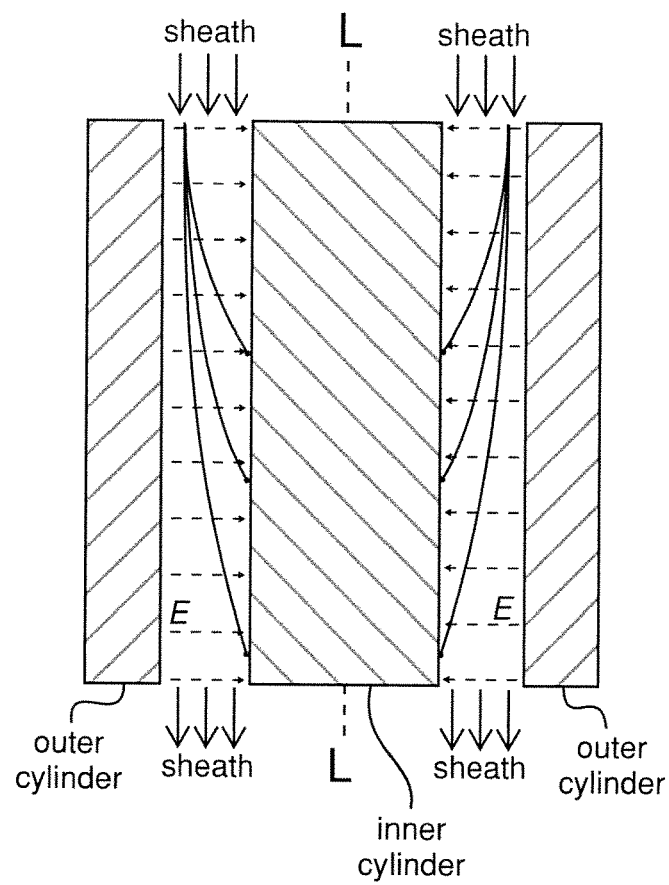
FIG. 22 shows a schematic of particle paths traveling in a cylindrical classifier.

FIG. 22 shows a diagram of a cylindrical classifier in cross-section. Notably, this system bears substantial similarity to FIG. 20. Despite the overall shape of the classifier being cylindrical, and despite the walls of the classification channel being formed by concentric inner and outer cylinders, particle path has non angular component (change in φ is zero).

As used, herein, a classification "zone" is distinguishable from a classification "channel". This disclosure treats a "channel" as a space which serves as a fluid conduit (e.g., where the fluid is an airstream containing an aerosol). A fluid by definition may be a liquid or a gas. A channel necessarily includes walls which the define the boundaries of the channel. That is to say, a channel is not simply empty space but actual physical structure(s) or surface(s) defining a bounded space. A classification "zone" is typically a part of a classification "channel", up to all of the channel. At the most general level, a classification zone is the portion or portions of the channel configured for particle classification. In some embodiments disclosed herein, a portion of a channel only conducts sheath flow (it never conducts aerosol flow). The classification zone is distinguished from conduits, outlets, inlets, tubules, passageways, channels, and the like which are not spaces configured for separating particles within that space by their respective mobilities.

"Flow" generally refers to gas molecules occupying some volume of space, the gas molecules having a net (non-zero) movement in some direction. The gas molecules are generally assumed to carry a neutral charge unless context specifies otherwise. As a result, flow direction or path is not affected by an electric field, although charged particles within the flow are affected by an electric field. Additional molecules, such as aerosol particles, may or may not be present in the same volume defined by neutral gas molecules. Herein, a sheath flow is generally treated as being a volume of neutral (i.e., uncharged) gas molecules having net (non-zero) movement in some direction. Aerosol flow is generally treated as being a volume of gas molecules among which are particles (e.g., suspended particles) of an aerosol. Total flow is frequently used herein to refer to a sheath flow and aerosol flow that have combined. Total flow may be the entire volume of gas occupying some portion or entirety of a channel. A total flow may accurately be referred to as an aerosol flow if it contains aerosol particles. A flow can also refer to liquid molecules instead of gas molecules, or some combination of liquid and gas molecules. A flow within a channel is generally directed (i.e., conducted) by the walls defining the channel.

Although flow direction or path is not affected by an electric field, charged particles within the flow are affected by an electric field. A charged particle therefore has a velocity vector that may be described according to at least two components. A first component of the particle velocity vector is the component attributable to flow direction. This component of particle velocity is not affected by an electric field, rather it is only affected by the bulk flow direction of the flow. A second component of the particle velocity vector is attributable to the electric field. This component may be referred to as electric field induced drift, and involves a net movement of the charged particles along electric field lines. The electric field induced drift causes charged particles to move in relation to neutral molecules (e.g., neutral gas molecules) around charged particles.

While exemplary embodiments of the present invention have been disclosed herein, one skilled in the art will recognize that various changes and modifications may be made without departing from the scope of the invention as defined by the following claims.

We claim:

1. A particle electrical mobility classifier, comprising:
a curved classification channel which extends circumferentially about a longitudinal axis of the particle mobility classifier, wherein the curved classification channel is formed by curved inner and outer wall parts spaced apart from one another and having electrically conductive surfaces spaced apart to create an electric field therebetween, and wherein the curved classification channel is configured to conduct aerosol particles within the curved inner and outer wall parts along at least one flow path selected from the group consisting of annular, spiral, wavy, and helical;

an aerosol flow inlet port configured to admit a polydisperse aerosol flow to the curved classification channel at a non-zero angle with respect to a line tangent to the classification channel, wherein the non-zero angle is not a 90° angle;

a sheath flow inlet port configured to admit a sheath flow to the curved classification channel; and at least one outlet port from the curved classification channel configured for output of classified particles, wherein the curved classification channel, the aerosol inlet port, the sheath flow inlet port, and the at least one outlet port are configured together to conduct flow in an angular direction by which aerosol particles in the flow rotate about the longitudinal axis of the classifier while in a classification zone of the curved classification channel.

2. The classifier of claim 1, further comprising a voltage source electrically coupled to the inner and outer wall parts of the curved classification channel, the coupling configured such that the inner wall part and outer wall part are oppositely polarized creating the electric field in the classification zone.

3. The classifier of claim 1, wherein the non-zero angle is less than 90°.

4. The classifier of claim 1, further comprising one or more additional ports for inflow or outflow of one or more of aerosol particles and sheath flow.

5. The classifier of claim 1, wherein the classification channel is continuously curved for an entire length of a classification zone while a cross section of the classification channel remains unchanged.

6. A method for classifying aerosol particles based on mobility, comprising:

providing a particle electrical mobility classifier according to claim 1;

admitting a polydisperse aerosol to the curved classification channel of the classifier, wherein the curved classification channel has inner and outer wall parts forming at least one configuration selected from the group consisting of annular, spiral, wavy, and helical;

admitting a sheath flow to the curved classification channel;

directing a total flow such that aerosol particles in the total flow travel in an angular path and rotate about a longitudinal axis of the classifier while traveling within the inner and outer wall parts in a classification zone of the classification channel; and obtaining classified particles from the classification channel.

7. The method of claim 6, wherein the polydisperse aerosol flow is admitted at a first position and the classified particles are obtained at a second position, and the first and second positions are oriented with respect to another such that only particles which travel in the angular path while in the classification zone reach the second position.

8. The method of claim 7, wherein the polydisperse aerosol is admitted via an aerosol flow inlet port arranged at the first position, the sheath flow is admitted via a sheath flow inlet port, and the classified particles are obtained with one or more outlets, at least one outlet of which is arranged at the second position.

9. The method of claim 6, wherein the sheath flow is admitted to the curved classification channel at a position and in a direction that urges aerosol particles in an angular path through a classification zone of the classification channel.

10. The method of claim 6, further comprising a step of selecting a particle size or size range for classification by setting or adjusting one or more of the total flow rate and an applied voltage, wherein the classified particles obtained are of the selected particle size or size range.

11. The classifier of claim 1, wherein the sheath flow inlet port is arranged upstream of the aerosol flow inlet port.

12. The classifier of claim 1, wherein a distance between the inner wall and the outer wall is ⅛ inch or less.

* * * * *